US011181680B1

(12) United States Patent
Sorensen et al.

(10) Patent No.: US 11,181,680 B1
(45) Date of Patent: Nov. 23, 2021

(54) LIGHTING SYSTEM WITH CURVING OR TWISTING MODULAR HOUSING

(71) Applicant: ABL IP Holding LLC, Atlanta, GA (US)

(72) Inventors: Christopher J. Sorensen, Arvada, CO (US); Christopher D. Slaughter, Littleton, CO (US); Joshua J. Miller, Highlands Ranch, CO (US); Peter K. Nelson, Denver, CO (US); Carl T. Gould, Golden, CO (US); Zachary A. Ingalls, Littleton, CO (US)

(73) Assignee: ABL IP Holding LLC, Atlanta, GA (US)

( * ) Notice: Subject to any disclaimer, the term of this patent is extended or adjusted under 35 U.S.C. 154(b) by 84 days.

(21) Appl. No.: 16/814,510

(22) Filed: Mar. 10, 2020

Related U.S. Application Data

(63) Continuation-in-part of application No. 16/691,515, filed on Nov. 21, 2019.
(Continued)

(51) Int. Cl.
*F21S 2/00* (2016.01)
*F21S 4/20* (2016.01)
(Continued)

(52) U.S. Cl.
CPC ............ *G02B 6/0036* (2013.01); *F21S 2/005* (2013.01); *F21S 4/20* (2016.01); *F21S 8/061* (2013.01);
(Continued)

(58) Field of Classification Search
CPC ............. F21S 2/00–005; F21S 4/00–28; F21S 8/00–088; F21V 14/02; F21Y 2115/10;
(Continued)

(56) References Cited

U.S. PATENT DOCUMENTS 5,688,035 A 11/1997 Kashima et al.
5,848,837 A 12/1998 Gustafson
(Continued)

OTHER PUBLICATIONS

"Knife Edge Wall and Surface Mount", Pose™, Available online at: www.axislighting.com, Oct. 4, 2019, 4 pages.
(Continued)

*Primary Examiner* — Jason M Han
(74) *Attorney, Agent, or Firm* — Kilpatrick Townsend & Stockton LLP

(57) ABSTRACT

A luminaire includes a housing, light-emitting diodes and a light guide. A lateral direction from a top side to a bottom side of the housing is a preferred direction. A front side of the housing forms an aperture. The light guide substantially spans the aperture. In operation, the LEDs emit light toward the preferred direction, which light enters a light coupling surface of the light guide, where it propagates and is substantially retained by total internal reflection. The light guide includes light extraction features to redirect a portion of the light out of total internal reflection, so that some of the light exits the housing through the aperture. The light extraction features redirect some of the light so that more of the light exits the aperture between a normal direction of the light guide and the preferred direction, than between the normal direction and the non-preferred direction.

17 Claims, 12 Drawing Sheets

Related U.S. Application Data

(60) Provisional application No. 62/849,419, filed on May 17, 2019, provisional application No. 62/770,576, filed on Nov. 21, 2018.

(51) Int. Cl.
*F21S 8/06* (2006.01)
*F21Y 115/10* (2016.01)
*F21V 8/00* (2006.01)
*F21V 14/02* (2006.01)

(52) U.S. Cl.
CPC ............ *F21V 14/02* (2013.01); *G02B 6/0051* (2013.01); *G02B 6/0055* (2013.01); *G02B 6/0068* (2013.01); *G02B 6/0073* (2013.01); *F21Y 2115/10* (2016.08)

(58) Field of Classification Search
CPC ........ G02B 6/0036; G02B 6/005–0053; G02B 6/0068; G02B 6/0073
USPC ...... 362/147–150, 217.01–217.17, 218–225, 362/249.02–249.06, 362, 368–375, 457
See application file for complete search history.

(56) References Cited

U.S. PATENT DOCUMENTS

| | | |
|---|---|---|
| 6,161,939 A | 12/2000 | Bansbach |
| 6,392,342 B1 | 5/2002 | Parikka |
| 6,486,790 B1 | 11/2002 | Perlo et al. |
| 6,827,456 B2 | 12/2004 | Parker et al. |
| 6,945,668 B1 | 9/2005 | Orlov et al. |
| 7,108,414 B2 | 9/2006 | McCollum et al. |
| 8,029,708 B2 | 10/2011 | Parker et al. |
| 8,052,307 B2 | 11/2011 | Bak et al. |
| 8,092,063 B2 | 1/2012 | Isoda |
| 8,152,352 B2 | 4/2012 | Richardson |
| 8,498,505 B2 | 7/2013 | Moore et al. |
| 8,721,152 B2 | 5/2014 | Coleman et al. |
| 8,783,898 B2 | 7/2014 | Coleman et al. |
| 8,794,812 B2 | 8/2014 | Coleman et al. |
| 8,814,410 B2 | 8/2014 | McCollum et al. |
| 8,827,531 B2 | 9/2014 | Richardson et al. |
| 8,899,813 B2 | 12/2014 | McCollum et al. |
| 9,170,364 B2 | 10/2015 | Ezell et al. |
| 9,316,780 B2 | 4/2016 | Ezell |
| 9,368,853 B2 | 6/2016 | Kroening et al. |
| 9,383,496 B2 | 7/2016 | Parker et al. |
| 9,563,006 B2 | 2/2017 | Ballard et al. |
| 9,563,007 B2 | 2/2017 | McCollum et al. |
| 9,703,031 B2 | 7/2017 | Sahlhoff et al. |
| 9,707,641 B2 | 7/2017 | McCollum et al. |
| 10,267,504 B2 | 4/2019 | Frederiksen |
| 10,544,906 B1 | 1/2020 | Openiano |
| 2006/0044824 A1 | 3/2006 | Chen |
| 2007/0285941 A1 | 12/2007 | Ishihara et al. |
| 2008/0089093 A1 | 4/2008 | Miller et al. |
| 2008/0239753 A1 | 10/2008 | Parker et al. |
| 2010/0296025 A1 | 11/2010 | Gourlay |
| 2011/0285292 A1 | 11/2011 | Mollnow et al. |
| 2011/0317421 A1 | 12/2011 | So |
| 2012/0262940 A1 | 10/2012 | Miyairi et al. |
| 2013/0010453 A1 | 1/2013 | Mahowald |
| 2015/0160395 A1 | 6/2015 | Sahlhoff et al. |
| 2015/0176823 A1 | 6/2015 | Leshniak et al. |
| 2016/0033704 A1 | 2/2016 | Sahlhoff et al. |
| 2016/0033712 A1 | 2/2016 | Sahlhoff et al. |
| 2016/0138789 A1 | 5/2016 | Brown |
| 2017/0351475 A1 | 12/2017 | Meersman et al. |
| 2018/0172257 A1 | 6/2018 | Hierzer |
| 2019/0191534 A1 | 6/2019 | De Bruycker et al. |
| 2019/0264882 A1 | 8/2019 | Gomez Martinez et al. |

OTHER PUBLICATIONS

U.S. Appl. No. 15/930,792, Non-Final Office Action dated Jun. 3, 2021, 21 pages.
U.S. Appl. No. 16/691,515, Non-Final Office Action dated Apr. 7, 2021, 14 pages.

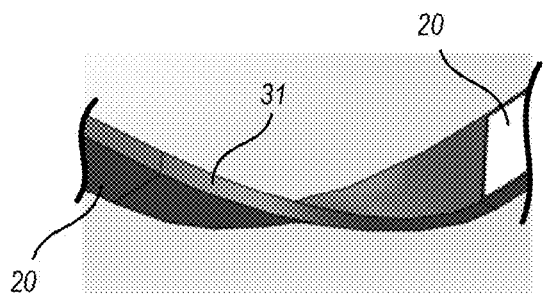
FIG. 5
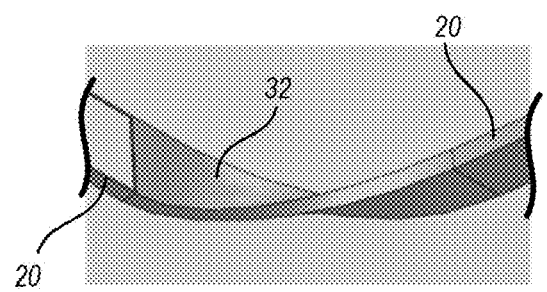
FIG. 6
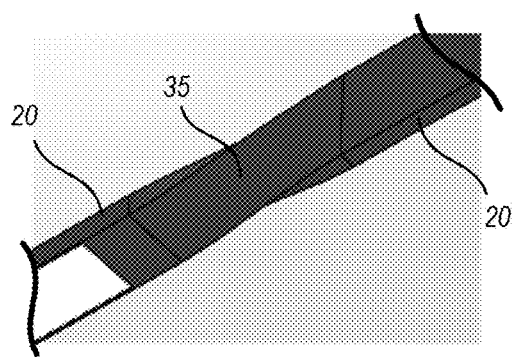
FIG. 7
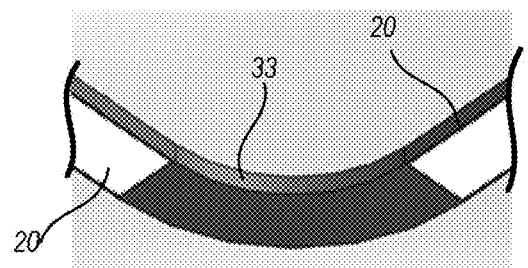
FIG. 8
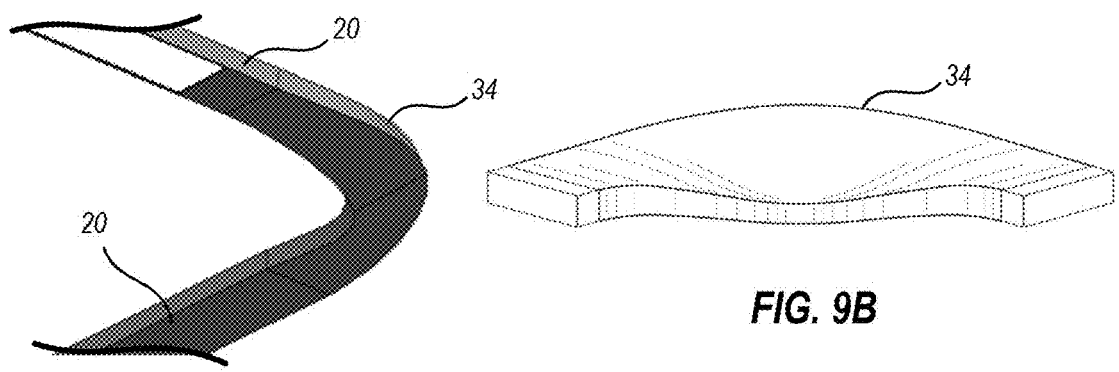
FIG. 9A
FIG. 9B

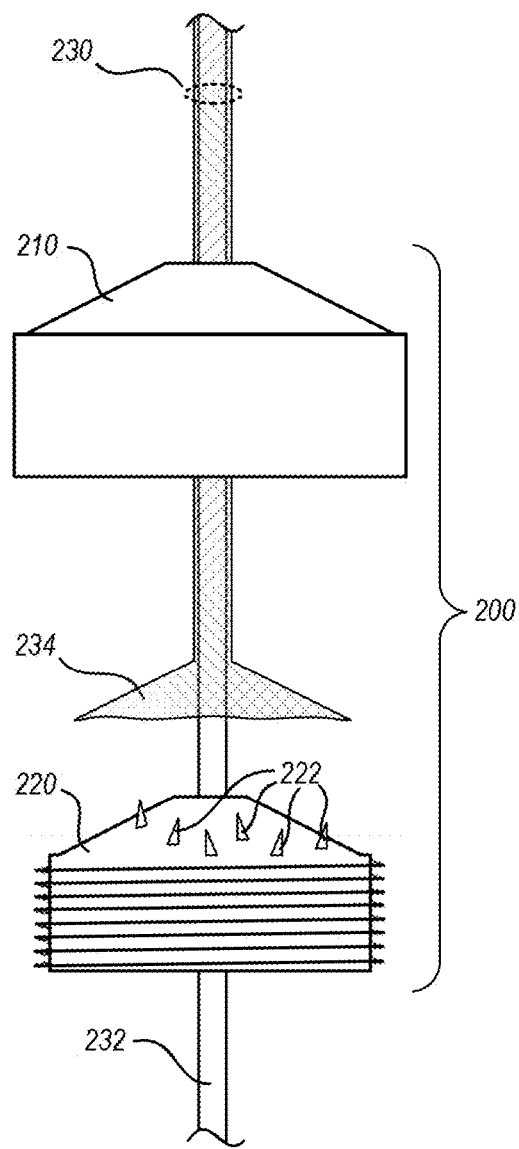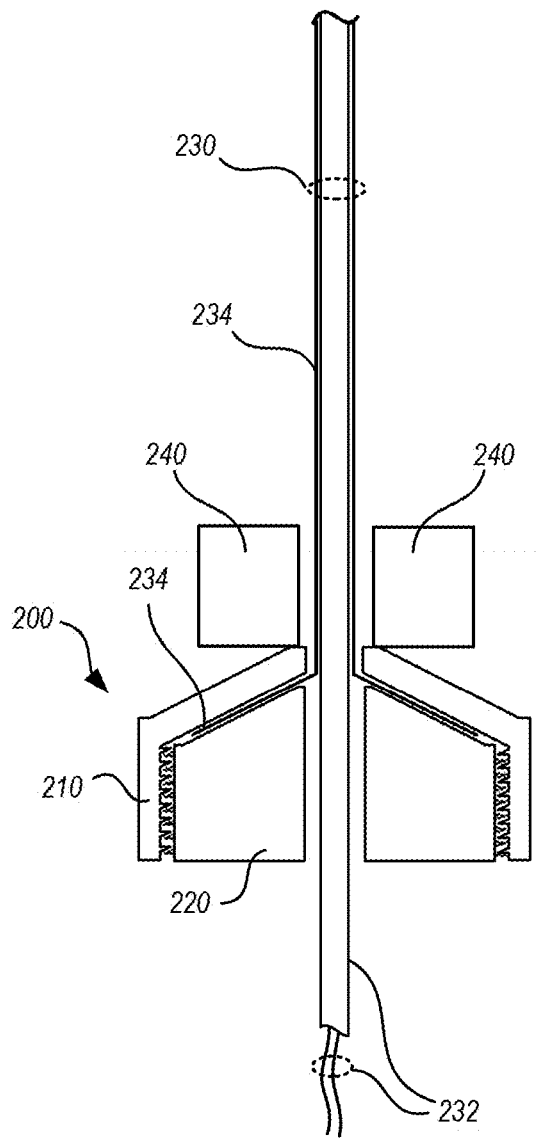
FIG. 18A
FIG. 18B

LIGHTING SYSTEM WITH CURVING OR TWISTING MODULAR HOUSING

CROSS-REFERENCE TO RELATED APPLICATIONS

This application is a continuation-in-part of U.S. patent application Ser. No. 16/691,515, which is a nonprovisional application of, and claims the benefit of priority to, U.S. Provisional Patent Application No. 62/770,576, filed 21 Nov. 2018, and U.S. Provisional Patent Application No. 62/849,419, filed 17 May 2019. All of the above-identified patent applications and provisional patent applications are incorporated herein by reference in their entireties for all purposes.

BACKGROUND

Many architectural spaces feature lighting systems that are suspended from structural supports, sometimes in the context of a grid-based dropped ceiling system, and sometimes not. Practical and aesthetic needs exist for further improvements in lighting systems.

SUMMARY

In one or more embodiments, a lighting system includes a first component housed within a first housing, a second component housed within a second housing, and a connector. The first housing defines a first rectangular cross-section that extends, linearly and without rotating, along a first axial direction from a first end to a second end, the first axial direction being transverse to the first rectangular cross-section. The first component is capable of emitting light. The second housing defines a second rectangular cross-section that is substantially identical to the first rectangular cross-section. The second rectangular cross-section extends, linearly and without rotating, along a second axial direction from a third end to a fourth end, the second axial direction being transverse to the second rectangular cross-section. The connector connects the second end with the third end. The connector defines a third rectangular cross-section that is substantially identical to the first rectangular cross-section. The third rectangular cross-section extends along a path from the second end to the third end, wherein (a) the path includes at least one curve of at least fifteen degrees between the second end and the third end, and/or, (b) the rectangular cross-section rotates at least fifteen degrees about the path.

In one or more embodiments, an apparatus for coupling with wiring is provided. The wiring includes an outer jacket and inner wiring, to provide mechanical support and power or signal conductivity for a load. The apparatus includes an upper member that forms an aperture therethrough, and a lower member that forms an aperture therethrough and is adapted to couple with the upper member. When the lower member couples with the upper member, the lower member and the upper member are configured to couple with the outer jacket, so that weight of the lower member, the upper member and the load transfers to the outer jacket. Also, the aperture formed by the lower member and the aperture formed by the upper member align so that the inner wiring can pass directly through the apparatus without bearing the weight of the lower member, the upper member and/or the load.

In one or more embodiments, a ribbon cable includes: one or more cables capable of supporting weight of at least a portion of a luminaire; two or more wires to provide electrical power and/or control functionality to the luminaire; and an outer jacket that encases the one or more cables and the two or more wires. The one or more cables and the two or more wires are aligned in a single row.

In one or more embodiments, a ribbon cable includes two or more wires, and an outer jacket that encases the two or more wires. The outer jacket forms one or more lengthwise apertures that are configured to engage one or more cables capable of supporting weight of at least a portion of a luminaire.

In one or more embodiments, a wiring apparatus includes a substantially planar first member and a second member. The first member includes a plurality of wire holders configured to engage a corresponding plurality of insulated wires, the plurality of wire holders being arranged transversely to a lengthwise direction of the plurality of insulated wires, each of the wire holders being arranged at known spacings therebetween. The first member also includes one or more retaining features. The second member includes a planar printed circuit board ("PCB") arranged in face to face opposition to the substantially planar first member, circuitry and/or light emitters coupled with a face of the PCB that faces away from the substantially planar first member, and a plurality of electrical connectors electrically connected with the PCB, and arranged on a face of the PCB that faces toward the substantially planar first member at the known spacings of the wires. When the second member is brought into proximity with the first member, each of the electrical connectors is configured to cut through insulation of the insulated wires to make an electrical connection between each insulated wire and the corresponding electrical connector, and the one or more retaining features engage with the PCB so as to hold the second member in place with respect to the first member.

In one or more embodiments, a luminaire includes a housing, light-emitting diodes and a light guide. A lateral direction from a top side to a bottom side of the housing is a preferred direction. A front side of the housing forms an aperture. The light guide substantially spans the aperture. In operation, the LEDs emit light toward the preferred direction, which light enters a light coupling surface of the light guide, where it propagates and is substantially retained by total internal reflection. The light guide includes light extraction features to redirect a portion of the light out of total internal reflection, so that some of the light exits the housing through the aperture. The light extraction features redirect some of the light so that more of the light exits the aperture between a normal direction of the light guide and the preferred direction, than between the normal direction and the non-preferred direction.

BRIEF DESCRIPTION OF THE DRAWINGS

The present disclosure is described in conjunction with the appended figures:

FIG. 5 schematically illustrates a twisting and curving connector with a right-hand twist, in accord with one or more embodiments.

FIG. 6 schematically illustrates a twisting and curving connector with a left-hand twist, in accord with one or more embodiments.

FIG. 7 schematically illustrates the twisting connector of FIG. 1, in accord with one or more embodiments.

FIG. 8 schematically illustrates a curving connector that makes a flat ninety degree curve, in accord with one or more embodiments.

FIG. 9A schematically illustrates a curving connector that makes a banked ninety degree curve, in accord with one or more embodiments.

FIG. 9B is an alternate view of the curving connector of FIG. 9A.

FIGS. 18A and 18B illustrate, in schematic exploded and cross-sectional views respectively, wiring and a finial apparatus that can be used to provide both mechanical support and electrical and/or signal connectivity to lighting systems herein, in accord with one or more embodiments.

DETAILED DESCRIPTION

Figure 1:
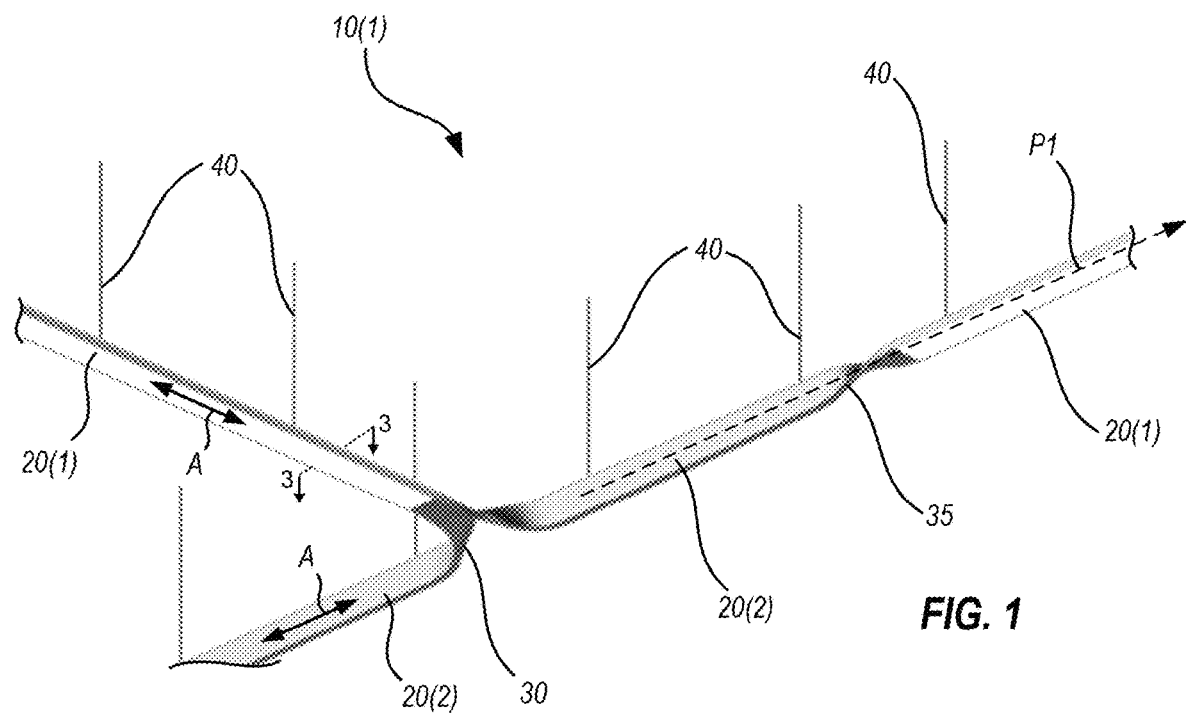
FIG. 1 illustrates a lighting system with a curving or twisting modular housing, in accord with one or more embodiments.

The present disclosure may be understood by reference to the following detailed description taken in conjunction with the drawings described below, wherein like reference numerals are used throughout the several drawings to refer to similar components. It is noted that, for purposes of illustrative clarity, certain elements in the drawings may not be drawn to scale. Specific instances of an item may be referred to by use of a first numeral followed by a second numeral within parentheses (e.g., luminaire sections 20(1), 20(2), etc.) while numerals not followed by a second numeral within parentheses refer to any such item (e.g., luminaire sections 20). In instances where multiple instances of an item are shown, only some of the instances may be labeled, for clarity of illustration.

Embodiments herein provide new and useful suspended lighting fixtures and methods. Several embodiments are contemplated and will be discussed, but embodiments beyond the present discussion, or intermediate to those discussed herein are within the scope of the present application.

Certain embodiments herein are related to the idea that luminaire sections, and/or connecting sections (or simply "connectors" herein) that join them, can be based on a long, slim form factor. The luminaires and/or connectors may provide a single unit that spans part or all of an illuminated space, or there may be separate units within a space. The luminaire sections may be linear, curved and/or twisted, and the connectors can be designed to join the luminaire sections through further twists or curves, giving the overall visual impression of a single strip, band, ribbon or the like. The form factor may be, for example, a linearly projected (e.g., extruded) profile, but can also be a profile that curves and/or twists along a direction that is transverse to the profile. That is, the luminaire sections and/or connectors can either be straight, or may curve or twist, in any direction. These embodiments provide a lighting designer with the freedom to join units with angles, curves and/or twists in any direction, sufficient to create installations that provide useful area, volume, task, spot, wall wash or other targeted lighting patterns, while maintaining visual continuity across an illuminated space.

Certain embodiments also provide advantageous control over the emitted light, as compared with typical existing luminaires. For example, as discussed below, it is possible to use embodiments herein to provide wall wash distributions with zero light emitted in the direct downward or reverse directions, so as to conceal the light source from typical viewer or occupant positions. When, in rare cases, the luminance source is viewed directly (e.g., by standing in front of a lit wall or painting and looking directly at the light source) the source of the luminance can be distributed over an area, so as to avoid the discomfort of viewing a bright point source directly. Still furthermore, shadowing can similarly be mitigated by distributing the luminance over an area instead of providing it from one or more point sources.

Luminaire sections and/or connectors can have rectangular or other cross-sectional profiles, such as a rectangular profile with rounded corners or sides, an oval profile, a triangular or truncated triangular profile, and others. A rectangular profile may, for example, have an aspect ratio of 1:1 (i.e., square), 2:1, 3:1, 4:1, 5:1, 6:1 or 8:1, or an aspect ratio intermediate to those listed. A direction that is transverse to the cross-sectional profile is considered a lengthwise or axial direction herein, and the luminaire section or connector will be said to extend along this direction, despite the fact that the luminaire section or connector may curve and/or twist, as well. Corners of rectangular profiles may be square, slightly rounded, or so fully rounded that one or more smaller sides of the rectangular profile form a continuous curve. Corners may be rounded to different degrees along different sides of the profile. For example, a "D" shape may be provided by fully rounding one side of the profile while leaving the other side of the profile straight.

A "substantially rectangular" profile is a subset of the profiles discussed above, that provides an interesting visual appearance, geometric continuity from place to place within an installation, and is relatively practical to manufacture. "Substantially rectangular" means herein that a luminaire portion (e.g., a housing of a portion of a luminaire that emits light, or all or part of a connector joining such portions together) can be bounded by four side segments that form a rectangular outline, with the housing portion including side structures that coincide with two parallel, opposing shorter ones of the side segments for at least 75% of the width of the two opposing shorter ones of the side segments, substantially from end to end of the housing portion. In this sense, "coincides with" means that edges of the side structures extend along the two opposing shorter ones of the side segments, with the exception of normal manufacturing tolerances, finishes and/or minor fasteners. "Substantially from end to end" means herein that the substantially rectangular cross-section is formed by the housing at each end of the housing portion, and for at least 75% of the length of the housing portion. The housing portion may include at least some center structure connecting the side structures, but the center structure need not be continuous along the length of the housing portion. The center structure does not extend outside the rectangular outline with the exception of normal manufacturing tolerances, finishes and/or fasteners. The minimums of 75% for widths of side structures that extend along the two opposing shorter ones of the side structures that are considered "substantially rectangular," and for lengths of a housing portion that are "substantially rectangular" along a total length of the housing portion, are minimum percentages that are considered to provide a clean "rectangular" look for the housing portion. Housing portions herein are observed to provide a more polished look when these minimums are raised to 80%, and still more polished at 85%. Above 85% or 90%, an observer may not notice differences in the rectangularity of housings, or continuity of housings' rectangularity along their lengths. Nevertheless, the present disclosure contemplates housings with widths of side structures that extend along the two opposing shorter ones of the side structures along 75%, 80%, 85%, 90%, 95% or 100%, or values intermediate to the values listed, of the total widths of the shorter sides.

Light may be emitted from one or more sides of luminaire sections. The luminaire sections can emit light uniformly from a region, or the light can be directed either by optics integrated with the luminaire sections, and/or by the fact that the luminaire sections are oriented differently. For example, a first luminaire section may emit light downwardly. Another luminaire section may be oriented toward a wall, to provide a wall wash light distribution. In this case, two opposing longer segments of a substantially rectangular profile (e.g., the "long side" of the profile) may be within fifteen degrees of vertical. That is, the light emitting face may not be exactly vertical, but can be within a fifteen degree range of vertical, to accommodate manufacturing tolerances, intentional or unintentional skews in installation, or for aesthetic reasons. Yet another luminaire section may be oriented toward a ceiling, providing upwardly directed light for indirect lighting. In any of these configurations, light-emitting sections can emit light as generated by a light emitter, or as shaped by optics to narrow, widen, focus, diffuse, aim or otherwise redirect a net light distribution. Luminaire sections need not be identical within an installation, and the luminaire sections described above need not all be present within an installation. In particular, optics used to shape light distributions emitted by individual luminaire sections can and often will vary according to placement and orientation of the individual sections within an installation.

Luminaire sections herein may use any type of light emitter, such as incandescent bulbs, fluorescent bulbs, or light-emitting diodes (LEDs). In many embodiments herein, LEDs are advantageous due to their small size, high efficiency and availability in various colors, including "white" LEDs (for example, packaged devices that combine light from various colors of LED chips, and/or use phosphors or the light to produce longer wavelengths of light from short wavelength LED chips). Similarly, optics of any known type may be used, including without limitation, lenses, diffractive elements, reflectors, light guides, light redirecting films, diffusers, clear cover plates and the like. A light guide may take input light at one or more points (for example a row of LED chips acting as a line source along one edge of the light guide), and generally contain the light by total internal reflection (TIR) and/or with a reflective surface (e.g., a mirrored surface of the light guide, or an external mirror adjacent to the light guide). Light extracting elements can be used to scatter the light out of the TIR condition of the light guide, in desired locations and into desired directions. Placement, density and orientation of light extracting elements for a light guide may vary from place to place in order to provide uniform light extraction across a light emitting area of a light guide. In particular, a lower density of light extracting elements may be provided for one region of a light guide where light density within the light guide is high, and a higher density of light extracting elements may be provided for another region of a light guide where light density within the light guide is low. In this manner, a uniform density of extracted light can be provided despite the difference in light density from region to region within the light guide. Specific geometries of light extracting elements may also be tailored to scatter light into all angles irrespective of incidence angle within the light guide, or only deviate the light slightly from its incidence angle, or to any degree between these two extremes. This allows angular control of light emerging from the light guide, so the light can be made to emerge in a diffuse (e.g., Lambertian) distribution, or through a narrower range of angles, which need not be centered normal to a plane of the light guide.

Connecting sections (sometimes simply called "connectors" herein) between luminaire sections may be straight, curved, and/or twisted. Connectors can also provide visually rectilinear forms such as linear dovetail connections, corner dovetail connections, straight corners, flat T connections, dovetail T connections, and the like. The connectors can provide connectivity for power wiring and/or control wiring among luminaire sections, so that a given system need not require connection to power and controls, except at a single location—which location can also be made without visible wires, by abutting a floor, wall or ceiling, or by integrating power and/or control wiring within support cables (see, e.g., FIGS. 18A, 18B and the supporting description herein). Connectors may connect two, three, four or more luminaire sections, and/or other connectors. Connectors may connect luminaire sections that lie in a single plane (e.g., near or parallel to a ceiling) and/or may provide ways to join luminaire sections that extend along any direction. For example, a first luminaire section may extend horizontally, and a connector may connect the first luminaire section with a second luminaire section that extends vertically or diagonally. Typically, at least two components will be connected through a connector that forms at least one of a twist or a turn. In the case of turns, the turn may be at least 15 degrees, and possibly 20, 25, 30, 35, 40, 45, 50, 55, 60, 65, 70, 75, 80, 85, 90, 95 degrees or more, or a value intermediate to those listed. In the case of twists, the twist may be at least 15 degrees, and possibly 20, 25, 30, 35, 40, 45, 50, 55, 60, 65, 70, 75, 80, 85, 90, 95 degrees or more, or a value intermediate to those listed. Luminaires may be manufactured in seamless integrated form with one or more connectors. In certain embodiments, two or more than two luminaire sections will be joined with connectors to form a system with many twists, turns, branches and the like.

Systems formed of luminaire sections and connectors as described herein can visually fill or complement a volume within an illuminated space in a variety of ways. In some embodiments, luminaire sections can be confined to a given vertical height, and can be connected so as to provide a feeling of a virtual ceiling within a volume, circumscribe a perimeter of the space, or the like. In other embodiments, twisting and/or curving connectors can be used to arrange luminaire sections at various heights within the volume, to provide a visual impression of "filling" the volume with light. Odd shaped volumes (e.g., areas where multiple levels adjoin a space with a vaulted ceiling, and/or volumes that cannot be well categorized as having "levels" at all) can also be advantageously provided with lighting luminaire sections and connectors that fill portions of the volume, or all of the volume, as desired.

FIG. 1 schematically illustrates a lighting system 10(1) with a twisting modular housing, in accord with one or more embodiments. Lighting system 10(1) includes luminaire sections 20, of which two sections 20(1) are oriented horizontally with light-emitting areas 22 facing downward. The other two luminaire sections 20(2) are oriented vertically such that light emitting areas (if any) face away from the viewer. Luminaire sections 20 are connected with connectors 30 and 35, as illustrated. An axial direction A is noted with respect to some luminaire sections 20(1) and 20(2), but not noted in all luminaire sections shown in FIG. 1, for illustrative clarity. Each luminaire section 20 in FIG. 1 forms a substantially rectangular cross section transverse to its own axial direction. A sight line 3-3 in FIG. 1 shows a location within one luminaire section 20(1) at which the cross-sectional view of FIG. 3 is taken.

In lighting system 10(1), connector 30 is a twisting "Y" connector that connects three luminaire sections, while connector 35 is a twisting connector that connects only two luminaire sections. Lighting system 10(1) is suspended from some mechanical support (e.g., a ceiling, not shown in FIG. 1) by suspension cables 40. An exemplary path P1 is shown as beginning within one luminaire section 20(2), continuing through one connector 35, and ending within one luminaire section 20(1). Path P1 can be considered to define an axial direction along luminaire sections 20(1) and 20(2), and through connector 35. Path P1 undergoes a ninety degree rotation within connector 35 so that a cross-section of each end of connector 35 matches in shape and orientation relative to ends of luminaire sections 20(1) and 20(2) where they connect with connector 35. When a lighting system herein forms a twisted path like path P1, a connector 35 generally provides a twist of fifteen degrees or more.

Figure 2:
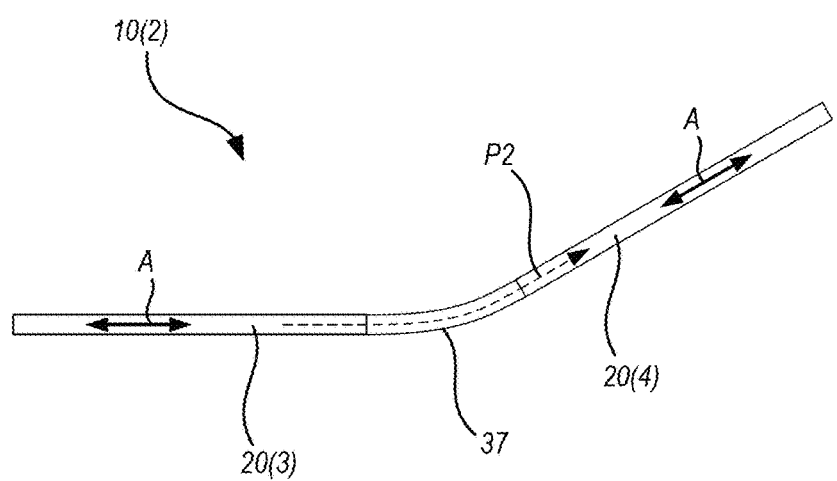
FIG. 2 schematically illustrates a lighting system with a curving modular housing, in accord with one or more embodiments.

FIG. 2 schematically illustrates a lighting system 10(2) with a curving modular housing, in accord with one or more embodiments. Lighting system 10(2) includes luminaire sections 20(3) and 20(4), of which one or both may be light-emitting. However, in these embodiments the light-emitting faces are not visible, as they are on the top or bottom faces of sections 20(3) and 20(4), perpendicular to the plane of FIG. 2. Luminaire sections 20(3) and 20(4) in system 10(2) are connected by a connector 37 that defines a curve, so that a first axial direction defined by luminaire section 20(3) is different from a second axial direction defined by luminaire section 20(4). An exemplary path P2 is shown as beginning along the first axial direction within luminaire section 20(3), continuing through connector 37, and ending along the second axial direction within luminaire section 20(4). Path P2 undergoes a thirty degree curve within connector 37 so that a cross-section of each end of connector 37 matches in shape and orientation relative to ends of luminaire sections 20(3) and 20(4) where they connect with connector 37. Because FIG. 2 is a side view, that is, the long side of the rectangular profile is perpendicular to the plane of the drawing, connector 37 will have a geometry wherein opposing wider faces of connector 37 curve so as to make one of the wider faces longer than the other, and opposing shorter faces of connector 37 curve, but remain the same length as one another. For example, the upper face of connector 37, as illustrated in FIG. 2, will be longer than the lower face. When a lighting system herein forms a curved path like path P2, a connector 337 generally provides a curve of fifteen degrees or more. Of course a connector can also have both a twist and a curve. An axial direction A is noted with respect to luminaire sections 20(3) and 20(4) and is different for the two luminaire sections due to their being connected through connector 37.

Figure 3:
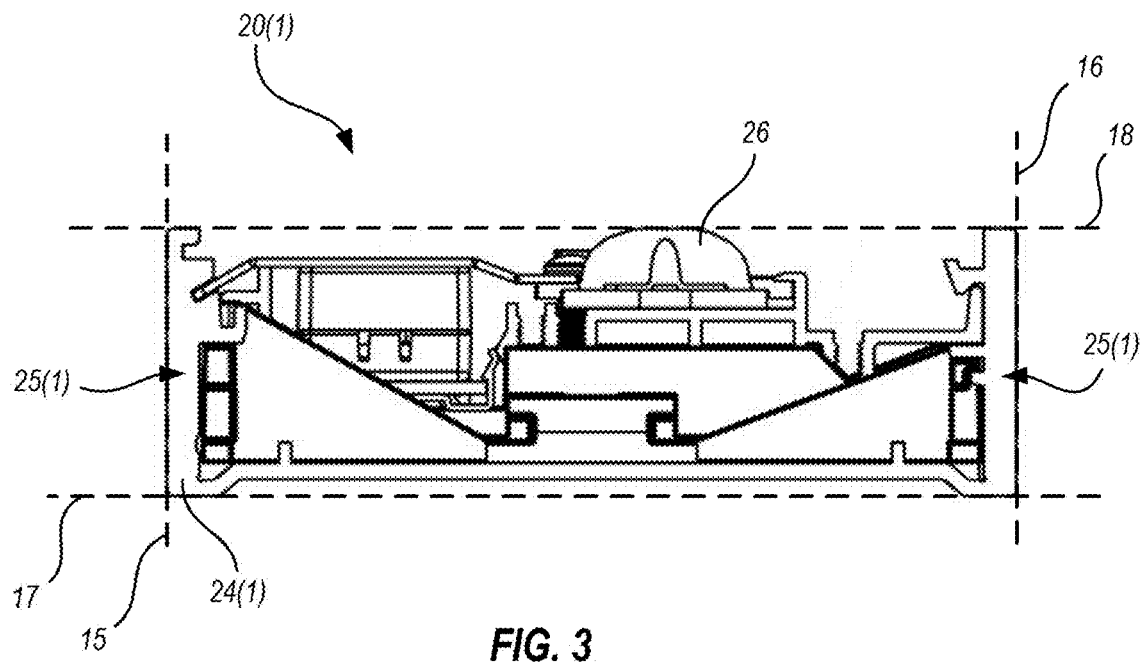
FIG. 3 schematically illustrates one luminaire section shown in FIG. 1, in a cross-sectional view, in accord with one or more embodiments.
Figure 4:
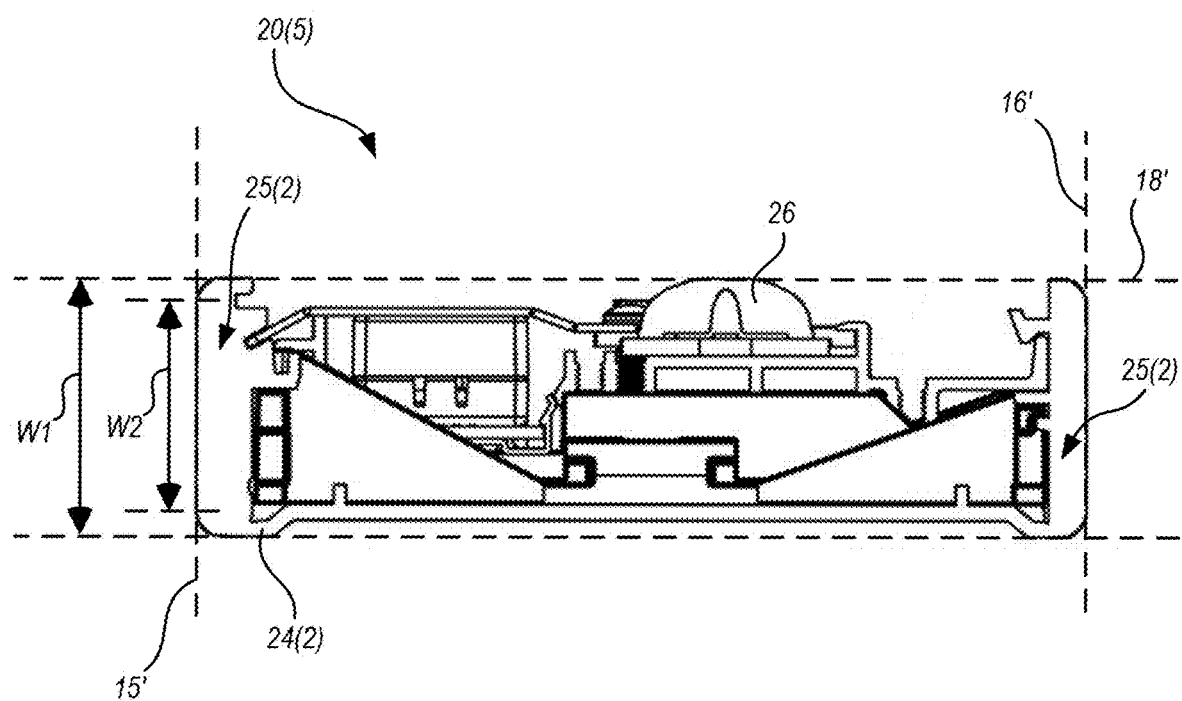
FIG. 4 schematically illustrates another luminaire section, in a cross-sectional view, in accord with one or more embodiments.

FIGS. 3 and 4 schematically illustrate, in cross-sectional views, two luminaire sections with "substantially rectangular" profiles. FIG. 3 schematically illustrates luminaire section 20(1), in a cross-sectional view taken at sight line 3-3 in FIG. 1. Luminaire section 20(1) includes exemplary components such as a housing 24(1) that forms side structures 25(1) at each side, an optic 26, and others. Luminaire section 20(1) fits within four side segments 15, 16, 17 and 18, as shown. Side segments 15 and 16 are opposing, parallel shorter ones of the side segments, and side segments 17 and 18 are opposing, parallel longer ones of the side segments. As discussed above, because side structures 25(1) coincide with side segments 15 and 16 for at least 75% of their respective widths, luminaire section 20(1) is said to be substantially rectangular. Note that the condition of coinciding with the side segments applies only to the opposing, parallel shorter ones of the side segments, and not to the opposing, parallel longer ones of the side segments. It can be desirable to not limit the opposing, parallel longer ones of the side segments to this condition for a variety of reasons. For example, the side of housing 24(1) that faces side segment 17 is actually recessed (e.g., is not coincident with side segment 17) for much of its length. This may be for manufacturing, aesthetic, handling, and/or optical reasons. One particular reason for recessing this surface is that the side of housing 24(1) that faces side segment 17 may be a light emitting surface; recessing this surface relative to the outer edges will help protect it from scratches, fingerprints and debris during manufacturing and installation. Also, as shown in FIG. 3, housing 24(1) does not, and need not extend about certain components (such as optic 26). Thus, all of side segments 15, 16, 17 and 18 are defined as those parallel line segments that at least form an outer boundary for all components of a corresponding luminaire section, irrespective of type or shape of the components.

FIG. 4 schematically illustrates another luminaire section 20(5), in a cross-sectional view. Luminaire section 20(5) includes exemplary components such as a housing 24(2) that forms side structures 25(2) at each side, an optic 26, and others. Luminaire section 20(5) fits within four side segments 15', 16', 17' and 18' (e.g., those parallel line segment that at least form an outer boundary for all components of luminaire section 20(5)), as shown. Comparing features of luminaire section 20(5) with similar features of luminaire section 20(1), it can be seen that side structures 25(2) are a little wider that side structures 25(1), and side structures 25(2) have substantially rounded corners. This reduces the width of side structures 25(2) that are coincident with side segments 15', 16'. However, luminaire section 20(5) still forms a substantially rectangular cross-section, because width W2, taken along the segment where side structure 25(2) is actually coincident with side segments 15', 16' (that is, excluding the rounded corners) is about 82% of width W1, taken at the outer extents of all structure of section 20(5).

Connectors between two luminaire sections herein can take many shapes. For example, FIG. 5 schematically illustrates a twisting and curving connector 31 with a right-hand twist. Connector 31 forms the same substantially rectangular cross-section as adjacent luminaire sections 20. FIG. 6 schematically illustrates a twisting and curving connector 32 with a left-hand twist. Connector 32 also forms the same substantially rectangular cross-section as adjacent luminaire sections 20. FIG. 7 schematically illustrates twisting connector 35 (which is also illustrated in FIG. 1). Connector 35 also forms the same substantially rectangular cross-section as adjacent luminaire sections 20. FIG. 8 schematically illustrates a curving connector 33 that makes a flat ninety degree curve, that is, the long sides of its cross-sectional shape sweep through a plane instead of forming angles with respect to the cross-section at its ends. Connector 33 also forms the same substantially rectangular cross-section as adjacent luminaire sections 20. FIG. 9A schematically illustrates a curving connector 34 that makes a banked ninety degree curve, that is, the long sides of its cross-sectional shape form an angle with respect to the cross-section at its ends. Connector 34 also forms the same substantially rectangular cross-section as adjacent luminaire sections 20. FIG. 9B is an alternate view that schematically illustrates the curving connector shown in FIG. 9A, to better show the banked turn between the ends of the connector. In each of connectors 31, 32, 33, 34 and 35, the connector forms the same substantially rectangular cross-section as adjacent luminaire sections 20, so that the cross-section of the respective connectors can match the cross-sections of luminaire sections 20 where they connect.

Connectors 31, 32 and 33 are also schematically illustrated in commonly-owned U.S. Design Patent Applications Nos. 29/671,054, 29/671,053, and 29/671,052 respectively, which are incorporated by reference herein in their entireties for all purposes.

Figure 10:
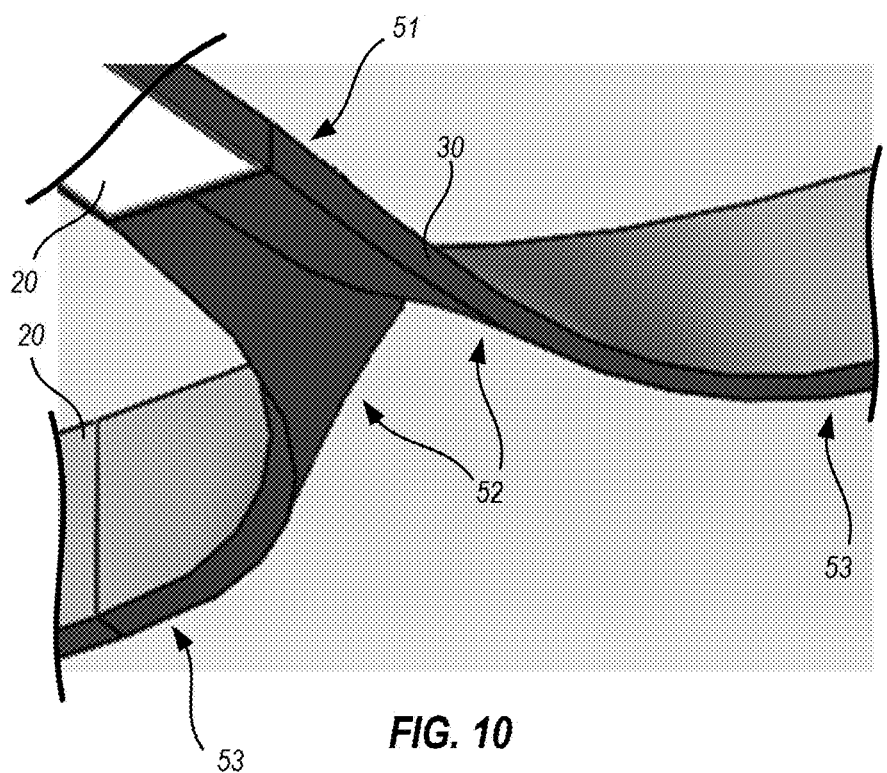
FIG. 10 schematically illustrates the three-way connector of FIG. 1, in accord with one or more embodiments.
Figure 11:
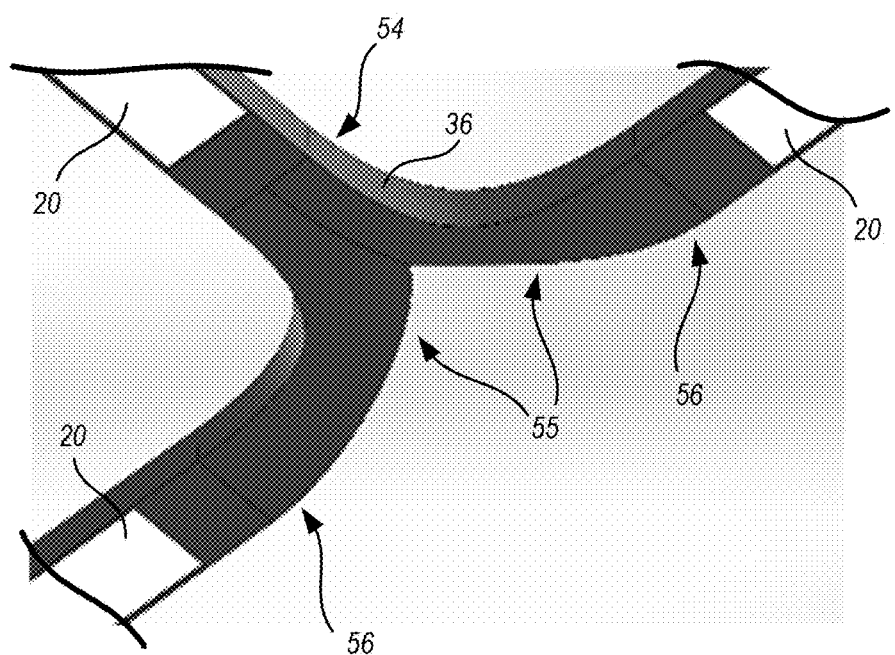
FIG. 11 schematically illustrates another three-way connector, in accord with one or more embodiments.

Connectors among three or more luminaire sections are also possible and can take many shapes. For example, FIG. 10 schematically illustrates a three-way connector 30 (which is also illustrated in FIG. 1). Connector 30 forms the same substantially rectangular cross-sections at its ends, as each adjacent luminaire section 20. A first end 51 of connector 30 couples with one adjacent luminaire section 20. Leading away from first end 51, connector 30 splits into two branches 52, each of which curves, twists and widens until reaching second and third ends 53, each of which couples with other luminaire sections 20. FIG. 11 schematically illustrates a three-way connector 36. Connector 36 forms the same substantially rectangular cross-sections at its ends, as each adjacent luminaire section 20. A first end 54 of connector 30 couples with one adjacent luminaire section 20. Leading away from first end 54, connector 30 splits into two branches 55, each of which curves and widens until reaching second and third ends 56, each of which couples with other luminaire sections 20. Of course, other connector geometries are possible, including those that connect more than three luminaire sections, and/or form straight segments from luminaire coupling ends to a central joining section, and/or join at different angles than those illustrated, and/or include multiple twists and/or curves, and the like. One of ordinary skill in the art, upon reading and comprehending the present disclosure, will conceive of many possible substitutions, equivalents and alternatives, all of which are within the scope of this disclosure.

Figure 12:
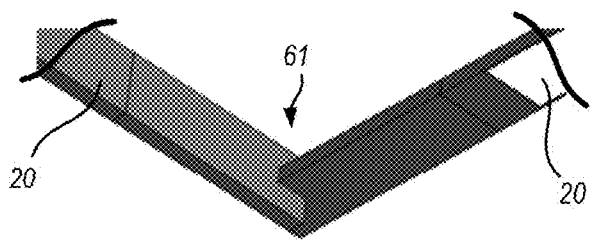
FIG. 12 schematically illustrates a connector that couples a first luminaire section in one orientation, with a second luminaire section that emits at a ninety degree angle with respect to the first, in accord with one or more embodiments.
Figure 13:
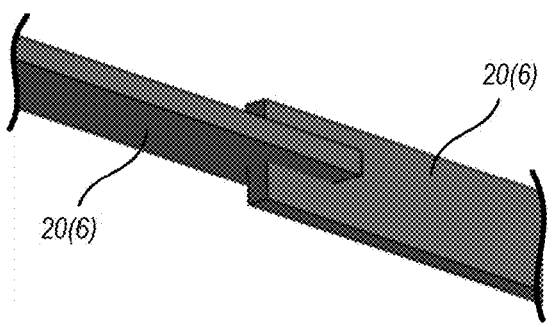
FIG. 13 schematically illustrates two luminaire sections with slots in ends thereof such that one luminaire section can be in a first orientation, and the second luminaire section along the same axial direction, can be in a second light emitting orientation, in accord with one or more embodiments.
Figure 14:
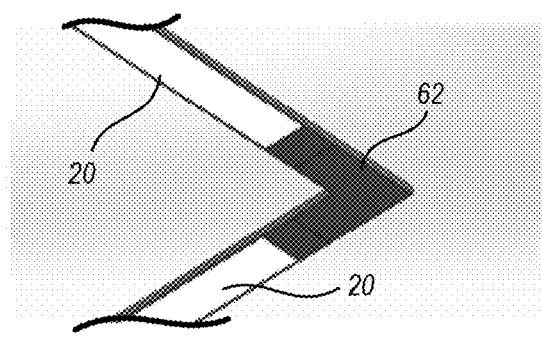
FIG. 14 schematically illustrates a connector that couples first and second luminaire sections that have the same light emitting orientation, but whose axial directions are ninety degrees different, in accord with one or more embodiments.
Figure 15:
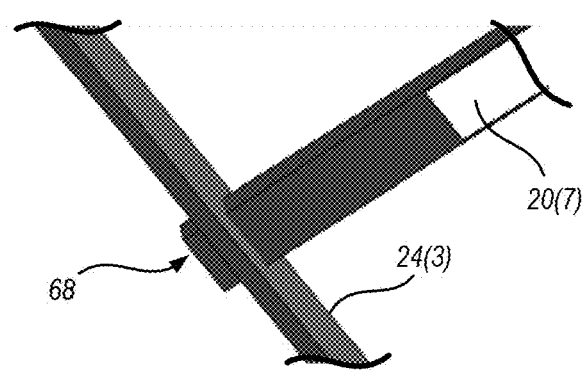
FIG. 15 schematically illustrates a luminaire section that has a large, non-light-emitting region at one end, extending through and coupling with a housing, in accord with one or more embodiments.
Figure 16:
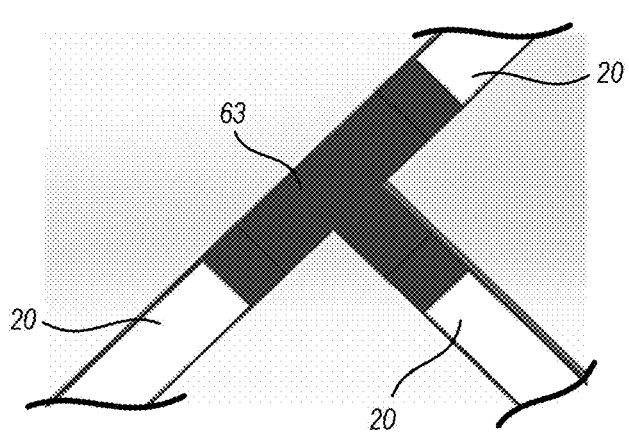
FIG. 16 schematically illustrates a three way connector connecting three luminaire sections, in accord with one or more embodiments.

FIGS. 12 through 16 schematically illustrate other possible connectors for, and ways to couple, luminaire sections having substantially rectangular cross-sections. The connectors and ways to couple luminaire sections shown in FIGS. 12 through 16 may be preferred for certain architectural spaces. In some cases a connector component is used, while in other cases, luminaire sections themselves directly couple with other luminaire sections. FIG. 12 schematically illustrates a connector 61 that couples a first luminaire section 20 in one orientation (e.g., one that emits downward within an architectural space) with a second luminaire section 20 that emits at a ninety degree angle with respect to the first. Axial directions of the two luminaire sections 20 are also ninety degrees different. Both the angular and light emitting angles may differ from those shown. FIG. 13 schematically illustrates two luminaire sections 20(6) with slots in ends thereof such that one luminaire section 20(6) can be in a first orientation, and the second luminaire section 20(6) along the same axial direction, can be in a second light emitting orientation. Thus, like the case shown in FIG. 12, the second luminaire section 20(6) emits at a ninety degree angle with respect to the first (the light emitting surfaces are both hidden in FIG. 13). FIG. 14 schematically illustrates a connector 62 that couples first and second luminaire sections 20 that have the same light emitting orientation (e.g., both emit downward within an architectural space) but whose axial directions are ninety degrees different. FIG. 15 schematically illustrates a luminaire section 20(7) that has a large, non-light-emitting region 68 at one end, extending through and coupling with a housing 24(3). Housing 24(3) may be a housing of a luminaire section as described herein, or a housing for a non-light-emitting segment that is provided for mechanical and electrical continuity within an installation. If housing 24(3) is a housing of a luminaire section, its light-emitting direction is ninety degrees different from that of luminaire section 20(7). FIG. 16 schematically illustrates a three way connector 63 connecting three luminaire sections 20. Three way connector 63 is functionally like connector 36 (e.g., both connectors 63 and 36 connect luminaire sections 20 that are oriented in the same light-emitting direction) but connector 63 uses rectilinear geometries instead of curving geometries.

Providing components for a lighting system with a curving or twisting modular housing generates certain new challenges for mechanical and electrical connectivity, some of which are now addressed.

In some embodiments, luminaire sections and/or connectors can be connected through the use of internal brackets that are not visible after the luminaire sections and/or connectors are connected. Other embodiments use a joiner that remains visible, and matches the profile of the luminaire sections and/or connectors that it joins, while it also aligns the luminaire sections in the axial direction.

Figure 17:
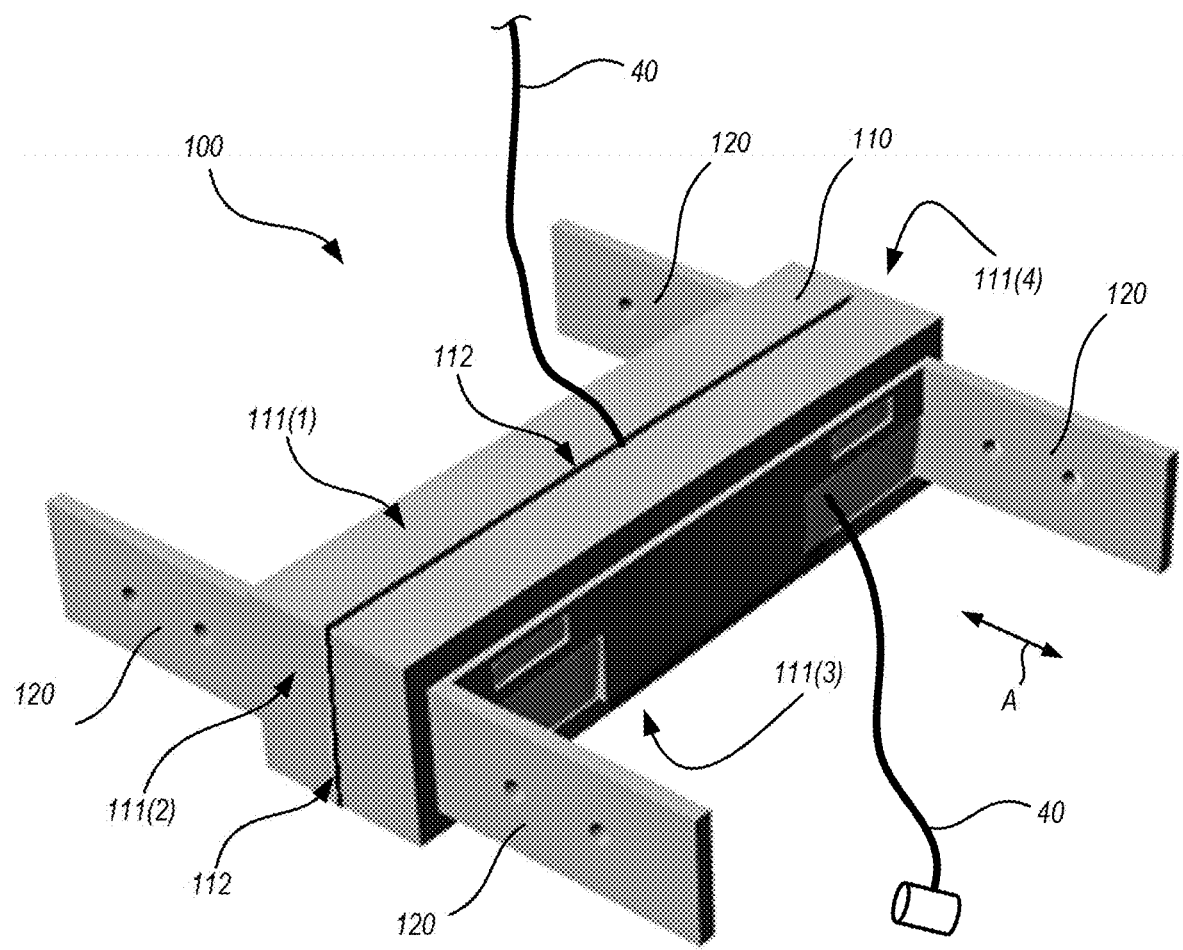
FIG. 17 illustrates a joiner that may be utilized to join luminaire sections, in accord with one or more embodiments.

Embodiments herein also include hardware for suspending the lighting systems disclosed herein, with optional flexibility to reposition and/or rotate the hardware about a point of suspension. FIG. 17 illustrates a hanger 100 that may be utilized to join luminaire sections 20, in accord with one or more embodiments. Hanger 100 includes a body portion 110 that forms four sides 111(1), 111(2), 111(3) and 111(4), and which may enclose or couple with further structural components of hanger 100. Sides 111(1), 111(2), 111(3) and 111(4) define a substantially rectangular profile as discussed herein, and can be configured to provide an exact match to the substantially rectangular profile of luminaire sections. FIG. 17 shows optional brackets 120 extending from body section 110. Optional brackets 120 are configured for insertion within luminaire sections 20, such that hanger 110 can act as a joiner for two luminaire sections, with ends of the luminaire sections abutting body section 110 to provide a finished look. That is, the visible cross-section of a system formed thereby will maintain visible continuity from each luminaire section 20, through body section 110 to the other luminaire section 20. Alternatively, hanger 100 can be integrated into a luminaire section itself, so that the luminaire section can be suspended without coupling first to a separate hanger or joiner.

At least one side 111 of body section 110 forms a slot 112 therethrough. In some embodiments, having slot 112 extend through at least portions of two adjoining sides 111 of body section 110, with slot 112 connecting through the corner formed by the adjoining sides, enables rotation of hanger 100 to accommodate installation or reconfiguration of an installed lighting system. A suspension cable 40 (e.g., as shown in FIG. 1) can pass through slot 112 within an upper surface of body section 110 such that a position of suspension cable 40 can be adjusted to balance the mechanical load supported thereby. A stopper end 42, however, is too large to pass through slot 112, so that hanger 100 and any luminaire section(s) attached thereto can be suspended from suspension cable 40. Cable 40 is inserted through open ends of body section 110 that are formed by sides 111(1), 111(2), 111(3) and 111(4). If brackets 120 are fixedly coupled so as to close both open ends of body section 110, at least one such bracket 120 may form a slot 122 that is large enough for stopper end 42 to pass through, so that body section 110 bears the weight of the installed lighting system.

The principles illustrated in FIG. 17 can also be utilized to form endcaps for luminaire sections, whereby the endcaps match the cross-section of an adjoining luminaire section where they meet. However, endcaps differ from joiners by providing a finished look to an end of a luminaire section by rounding off or otherwise terminating the cross-section in an aesthetically pleasing manner. Both endcaps and/or joiners can also provide functionality that may be addressed within a smaller linear footprint in the axial direction than typical luminaire sections. For example, endcaps and/or joiners can provide features such as sensors, loudspeakers, emergency lights, remote control receivers, mechanical mounting points (both to suspend the light fixture, and/or to suspend something from the light fixture) and the like.

Further construction details of hanger 100, and additional features that can enable balancing, leveling and/or multiple orientations, are provided in Appendix A of U.S. Provisional Patent Application No. 62/770,576, which is incorporated by reference herein.

In some embodiments, within the visual framework of a cross-sectional profile, some luminaire sections may be area (for example, Lambertian, but other area emitters are possible), spot, and/or line emitters. Luminaire sections may emit diffuse and/or directed light. Still other embodiments mount fixed or movable light emitters within a housing of a given cross-sectional profile, or may suspend fixed or movable light emitters from such a housing. These embodiments may include luminaires that provide two or more rails that circumscribe a cross-sectional profile that is identical to other luminaire sections and/or connectors of an installation, with fixed or movable light engines provided between, and/or suspended from, the two or more rails. In addition to movable light fixtures, adjustable or movable optics can be associated with light emitters so that light from the light engines can be redirected. This can be advantageous in that movable optics for redirecting light can often be generated with lower cost and better reliability than movable light engines. Adjustable or movable optics can be associated with either fixed or movable light fixtures. Availability of different luminaires that can provide various light types but all have the same cross-sectional profile can be thought of as enabling different "layers" of light while staying within a single visual form factor, which may be considered aesthetically pleasing. Providing light engines between and/or suspended from two or more rails may also assist in thermal dissipation, in that ambient air would be available to flow between the rails and/or around the light engines. This strategy may enable deployment of higher light power units than would otherwise be possible, due to limited heat dissipation. Connectors may also be fashioned with two or more rails to visually mimic luminaire sections that similarly have two or more rails. Further examples of luminaire sections with two or more rails that circumscribe the same form factor as other luminaires in the same installation, are provided in Appendix A of U.S. Provisional Patent Application No. 62/770,576, which is incorporated by reference herein.

Luminaire sections and/or connectors herein may be dimensioned so as to be readily installed with a ceiling or other mounting surface that presents mechanical and/or electrical support at specific intervals. Such intervals may be provided, for example, by 1'×1', 18"×18", 2'×2', 4'×4' and other grid type layouts. Examples of modular components dimensioned to couple with a standard mounting and/or power grid, are provided in Appendix A of U.S. Provisional Patent Application No. 62/770,576, which is incorporated by reference herein.

Lighting fixtures herein may utilize other novel strategies for providing mechanical support, power connectivity and/or signal connectivity. For example, FIGS. 18A and 18B illustrate, in schematic exploded and cross-sectional views respectively, wiring 230 and a finial apparatus 200 that can be used to provide both mechanical support and electrical and/or signal connectivity to lighting systems herein. Wiring 230 includes inner wiring 232 and an outer jacket 234. Inner wiring 232 may include conductors to provide electrical power to a lighting system, control wiring, and/or other forms of connectivity (e.g., fiber optics), which all may be denoted as "wires" herein, despite some of them not being physical wires. Inner wiring 232 may include individual loose (e.g., mechanically independent) wires, and may optionally include a sheath that encloses such wires, as illustrated in FIG. 18B. Outer jacket 234 is mechanically strong so as to be capable of supporting the weight of light fixtures herein. Outer jacket 234 can encase, but is not rigidly attached to, inner wiring 232. Outer jacket 234 is capable of being physically separated from, and flared away from (or otherwise made mechanically separate from) inner wiring 232. In one example, outer jacket 234 is a braided wire sheath, which may be particularly advantageous because a braided wire or other conductor used as outer jacket 234 can shield inner wiring 232 from being subject to, and/or emitting, electromagnetic interference. In this example, outer jacket 234 can be partially pulled apart into a flared end that attaches mechanically to finial 200, while inner wiring 232 passes through to a fixture beneath.

Finial 200 is capable of attaching to outer jacket 234 so as to transmit weight of a load 240 (e.g., a luminaire section or other component) through outer jacket 234, without subjecting inner wiring 232 to the weight. For example, it should be understood that load 240 is represented schematically only as resting upon an upper surface of upper member 210, but other modes of transferring weight of a load to finial 200 are possible. In the embodiment illustrated in FIGS. 18A and 18B, finial 200 includes an upper member 210 and a lower member 220 that attach to outer jacket 234 by screwing together with one another, with a flared end of outer jacket 234 trapped therebetween. Either upper member 210 and/or lower member 220 may form retention features 222 to help finial 200 couple mechanically with outer jacket 234. In FIG. 18A, retention features 222 are illustrated as small spikes on a surface of lower member 220, but other raised and/or depressed such as ridges, dimples, spiral features (that, optionally, run opposite to the direction of threads connecting upper member 210 with lower member 220) and more are possible. It is also possible to form one or more coupling features for outer jacket 234 as portions of either upper member 210 or lower member 220 alone. In such cases, outer jacket 234 can couple directly to the member that forms the coupling feature(s), and then the lower member can couple with the upper member without affecting the coupling of outer jacket 234. In certain embodiments, finial 200 can be deployed such that load 240 rests solely atop finial 200, as shown in FIG. 18B, or finial 200 can be deployed within a component such as a luminaire section, a connector or a joiner section as disclosed herein, so that finial 200 is surrounded by the component, and not visible after installation. Also, in certain embodiments, finial 200 can be integrated with such a component. That is, a luminaire section, a connector or a joiner section can form one of upper member 210 and/or lower member 220, such that when connected, the weights of the component and/or other components with which the component is connected, can all transfer to outer jacket 234.

Although finial 200 is illustrated in FIGS. 18A, 18B as having a generally cylindrical shape with a truncated conical upper surface, it is understood that this is for illustrative purposes only, and finial 200 may have any other convenient shape. Similarly, although lower member 220 is illustrated as screwing into upper member 210, other modalities of coupling lower member 220 with upper member 210 so as to couple outer jacket 234 with finial 200 are also possible. It should also be understood from FIG. 18B that when outer jacket 234 is coupled with finial 200, apertures formed by upper member 210 and lower member 220 align, so that finial 200 and outer jacket 234 may form a continuous aperture extending within outer jacket 234 above finial 200, through upper member 210 and lower member 220, to an opposite side of finial 200. Thus, the possibility exists that outer jacket 234 can couple with finial 200 before inner wiring 232 is present, and inner wiring 232 can be added later, or omitted when not needed (e.g., when only mechanical connectivity, but not signal or power connectivity, is needed).

Figure 19:
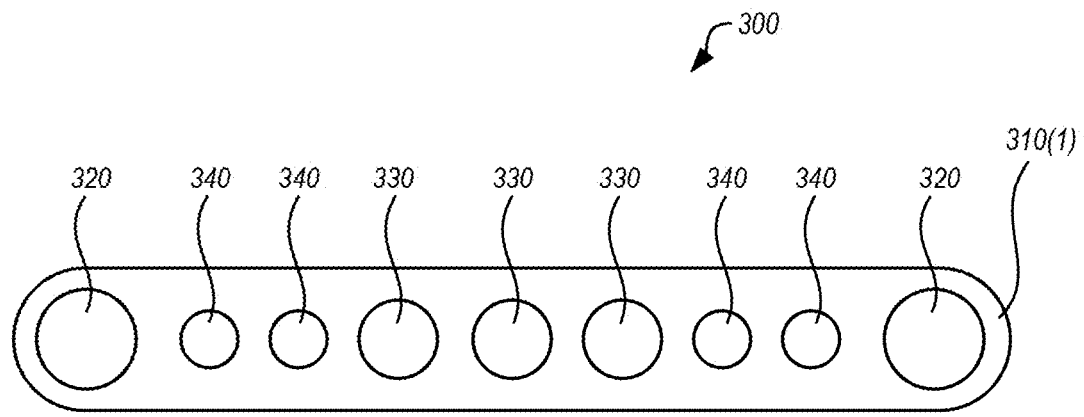
FIG. 19 illustrates, in a schematic cross-sectional view, a ribbon cable that provides mechanical support and electrical and/or signal connectivity to lighting systems herein, in accord with one or more embodiments.

Other novel strategies for providing mechanical support, power connectivity and/or signal connectivity are possible. For example, FIG. 19 illustrates, in a schematic cross-sectional view, a ribbon cable 300 that provides mechanical support and electrical and/or signal connectivity to lighting systems herein. Ribbon cable 300 may be considered more aesthetically pleasing than separate mechanical and/or electrical connectors, and especially more pleasing than multiple mechanical and/or electrical connectors, when used with lighting systems herein. This is due to ribbon cable 300 visually mimicking, or at least approximating, the visual form factor of the luminaire sections, connectors, joiners and the like disclosed elsewhere herein, and simplifying mechanical and electrical interfaces of such apparatus from separate mechanical and/or electrical wires, cables and the like, to a single component.

Ribbon cable 300 includes an outer jacket 310(1) that encases and stabilizes mechanical support features such as cables, and electrical and/or other (e.g., fiber optic) wires. Thus, in embodiments, a single ribbon cable 300 may be able to provide all of the mechanical support, power and control functionality to light fixtures described herein (or any light fixtures). Alternatively, a ribbon cable 300 may provide only such support and/or functionality for one portion of a luminaire, while other ribbon or standard wires or cables provide support and/or functionality to other portions of the luminaire. Ribbon cable 300 also includes, for example, cables 320 that can provide mechanical support, and wires 330 and 340 that provide power and/or controls, for a light fixture. In certain embodiments, cables 320 may be ⅛ inch woven or twisted steel cable, and are disposed outwardly of other wires within cable 300 (e.g., at the greatest and least values of the X axis shown in FIG. 19) to provide stability and/or protection for wires 330 and 340. Wires 330 may be heavy gauge (e.g., 12- to 16-gauge) wire of copper or other good electrical conductor to provide power and ground functionality for a light fixture. Wires 340 may be lighter gauge (e.g., 18- to 24-gauge) wire, or other media such as fiber optic, to provide control functionality for a light fixture. Material of jacket 310 may be chosen for qualities such as insulation, pliability, durability, moldability and the like. Although two cables 320, three wires 330 and four wires 340 are illustrated in FIG. 19, other multiples of cables and wires are contemplated. Specific combinations that are useful include at least one cable and two wires, at least one cable and three wires, at least one cable and four wires, at least two cables and two wires, at least two cables and three wires, and at least two cables and four wires.

Figure 20:
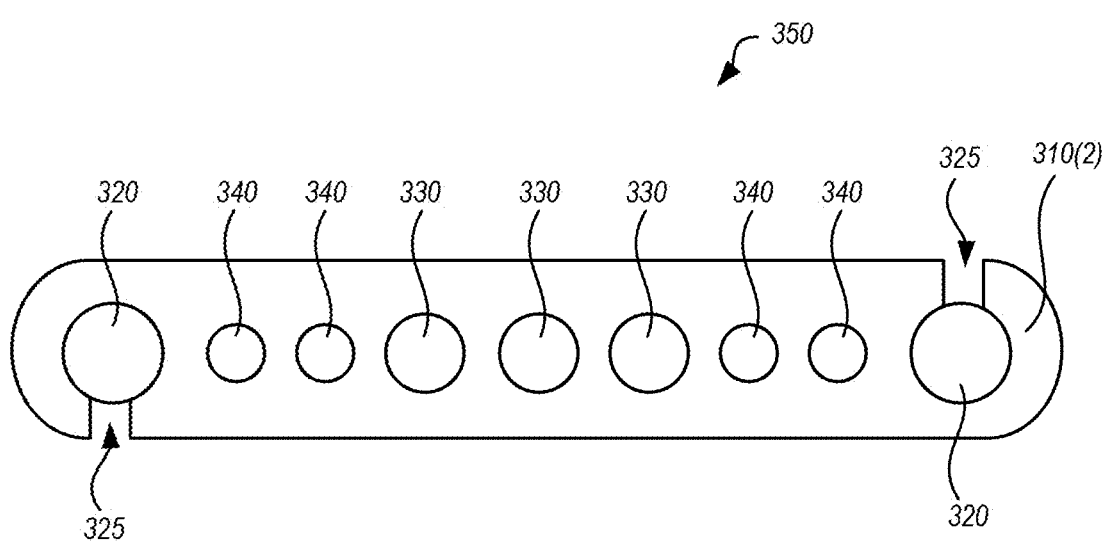
FIG. 20 illustrates, in a schematic cross-sectional view, a ribbon cable that provides mechanical support and electrical and/or signal connectivity to lighting systems herein, in accord with one or more embodiments.

In another example, FIG. 20 illustrates, in a schematic cross-sectional view, a ribbon cable 350 that provides mechanical support and electrical and/or signal connectivity to lighting systems herein. Ribbon cable 350 is similar to ribbon cable 300, except that cables 320 are not fully enclosed within jacket 310(2). Instead, cables 320 occupy recesses 325 within jacket 310(2). Constructed in this way, ribbon cable 350 enables installation of a light fixture by hanging it by cables 320 first, then installing ribbon cable 350 by pushing cables 320 into recesses 325, then connecting wires 330 and/or 340 with circuitry of the light fixture, as needed. This allows the connections of wires 330 and/or 340 to be made without concern for simultaneously managing transfer of a light fixture's weight to cable 350. Anyone who has ever installed a light fixture by connecting wires, before affixing the light fixture to support structure, will immediately understand the benefit thereof.

Further modifications of cables 300 and/or 350 to facilitate installation are also possible. For example, Appendix A of U.S. Provisional Patent Application No. 62/770,576, which is incorporated herein by reference, discloses cables that form "clamshell" and "zipper" structures about a suspension cable. In each case, the cables include wiring for power and/or signal connectivity, within a jacket that can be placed about a previously installed suspension cable. In such cases, again, a light fixture can be mechanically installed by connecting the suspension cable, then adding the cable that includes the power and/or signal connectivity.

It is to be understood that the types and placement of components within ribbon cables 300 and 350 as described above and in Appendix A of U.S. Provisional Patent Application No. 62/770,576 are exemplary only, and such components can be changed in number, type or position as needed. For example, when more cables or wires are required for a given application, they can be oriented in a single line as shown in cables 300 and 350, or in multiple rows as needed (e.g., multiple rows in the Y direction shown in FIG. 19). Cables 320 are advantageously distributed symmetrically and/or to outside edges so as to provide stability and/or protection for other components. Specific placement of wires 330 and 340 within jackets 310 may not be critical, although symmetric layout may be desirable for moldability and/or aesthetic appearance. Recesses 325 may be provided at any convenient location within jackets 310 as desired to facilitate manufacturing and/or installation of ribbon cables and light fixtures herein.

Further examples of ribbon cables and/or zipper type cables, are provided in Appendix A of U.S. Provisional Patent Application No. 62/770,576, which is incorporated herein by reference.

Figure 21:
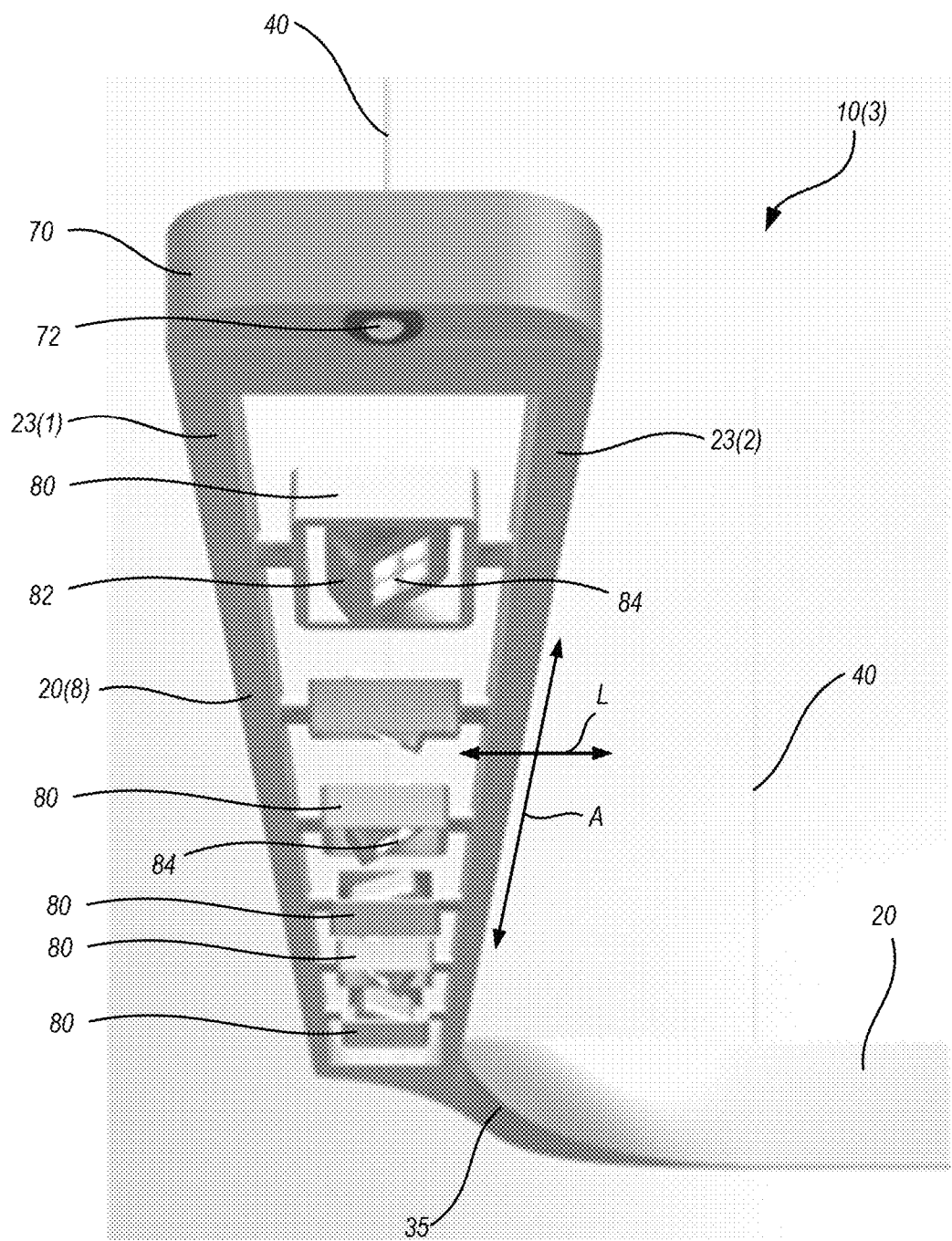
FIG. 21 schematically illustrates a lighting system that includes a luminaire section, a connector, and a second luminaire section, in accord with one or more embodiments.

FIG. 21 schematically illustrates a lighting system 10(3) that includes a luminaire section 20(8), a connector 35 as discussed above, and a second luminaire section 20. Lighting system 10(3) is suspended at least by suspension cables 40 as shown, and may be coupled with other components that are also suspended or otherwise mechanically supported. Luminaire section 20(8) can be provided with a substantially rectangular cross-section as discussed above, so as to match other components of the lighting system for aesthetic appeal. Luminaire section 20(8) includes rail members 23(1), 23(2) that extend parallel with one another along axial direction A, and separated by a lateral distance along a lateral direction L, as shown. Rail members 23(1), 23(2) define the substantially rectangular cross-section, and can provide electrical wiring for power or control for lighting modules 84 of luminaire section 20(8). First and second ends of both rail members 23(1), 23(2) are joined so as to form the complete luminaire section 20(8).

Lighting modules 84 are mounted within rotatable mounts such that at a home position, all portions of luminaire section 20(8) are within the substantially rectangular cross-section, but when rotated, may extend from it. For example, first mounts 80 couple with one or both of rail members 23(1), 23(2), and can rotate such that the light from a lighting module 84 within mount 80 essentially sweeps along axial direction A; this can include rotating upwardly so that lighting module 84 provides uplight. Second mounts 82 can also be provided, each mounted within a corresponding first mount 80. Second mounts 82 can rotate such that the light from a lighting module 84 within a mount 82 essentially sweeps across a lateral direction L; this can also include rotating upwardly so that lighting module 84 provides uplight.

FIG. 21 also schematically illustrates an endcap 70 that may be utilized with lighting systems herein. Endcap 70 provides a clean finished look and can provide a housing for components that may be occasionally used in connection with lighting systems. For example, endcap 70 as shown in FIG. 21 includes a sensor 72 (which may be a light sensor, motion sensor or any other type of sensor) and an anchoring point for a suspension cable 40.

Innovations in light fixtures themselves are also illustrated in Appendix A of U.S. Provisional Patent Application No. 62/770,576, which is incorporated herein by reference. For example, in light fixtures as contemplated herein, electrical power and/or signal connectivity may need to pass through successive luminaire sections, joiners, hangers, and connectors within a given installation. Thus, certain wires may run the length of luminaire sections in parallel with lighting components in a slim form factor, such that space is at a premium. In certain embodiments, this problem is addressed by providing a bracket on one side of a light fixture that holds insulated wires securely in place at known locations, with a mounting bracket that has latching features. Then, a printed circuit board ("PCB") that provides the lighting components, is provided that can simultaneously (1) latch into the latching features of the bracket, and (2) use sharp features placed at precise locations on the back of the PCB, to slice through the insulation, and provide connectivity for the lighting components on the PCB, to the insulated wires. The structure disclosed also minimizes assembly cost and maximizes flexibility by allowing structures that bear wires to be manufactured ahead of time without respect to application that can later be mated with PCBs to provide various forms of electrical or optical output as desired. The final installation of the PCB to the luminaire section can also be performed without tools, by simply pressing the PCB into the latching features.

Figure 22:
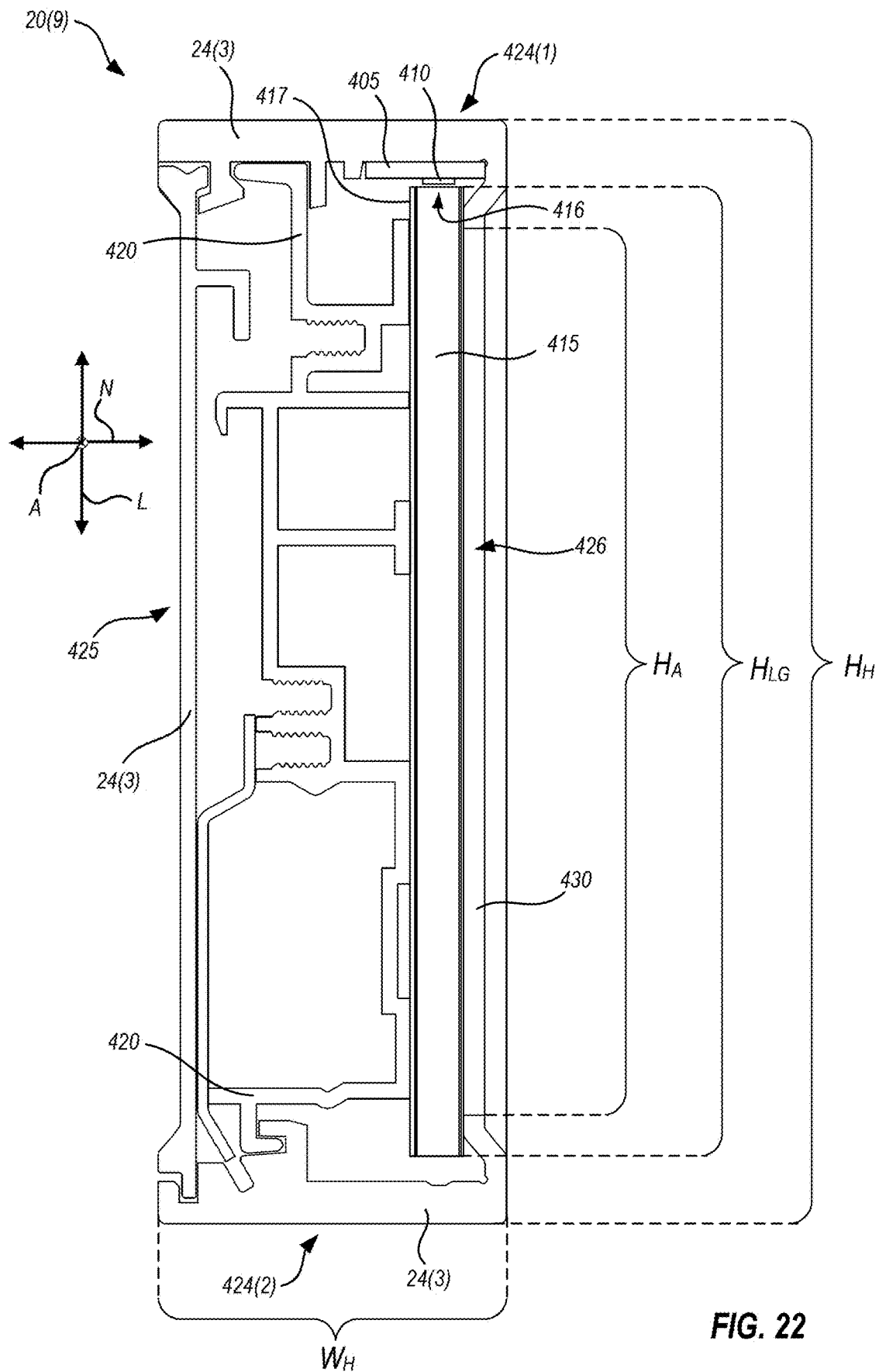
FIG. 22 schematically illustrates an embodiment of a luminaire section in a cross-sectional view, in accord with one or more embodiments.

In another innovation to cope with the limited space available in slim profile luminaire sections, light-emitting diodes ("LEDs") emit from a PCB into a light guide. Extraction and/or scattering features within or on surfaces of the light guide, and further optics (e.g., reflectors or refractive films) behind or in front of the light guide, can be used to provide a variety of light distributions from the luminaire section. FIG. 22 schematically illustrates an embodiment of a luminaire section 20(9) in a cross-sectional view. Luminaire section 20(9) includes a light guide 415 that is vertical (or near vertical) when installed, as shown, and emits light in a direction that is normal to a surface of the light guide. Axes labeled with the normal (N), lateral (L), and axial (A) directions are provided for clarity; the axial (A) direction is in and out of the cross-sectional plane of FIG. 22. Each of the N, L and A axes are transverse to one another. Light provided by luminaire section 20(9) can be emitted into a distribution that may be centered normal to the surface of the light guide (e.g., horizontal in the view of FIG. 22) or may be intentionally skewed upward or downward relative to normal, as discussed below.

Luminaire section 20(9) includes a housing 24(4) that in turn includes a top side 424(1) and a bottom side 424(2). As in embodiments disclosed above, housing 24(4) may define a substantially rectangular cross-section, but this is not required. Top side 424(1) and bottom side 424(2) each extend along the normal direction, as shown. A distance $H_H$ is the height of housing 24(4), measured between a top surface of top side 424(1), and a bottom surface of bottom side 424(2), along the lateral direction. For purposes of discussing skewed distributions, the downward lateral direction shown in FIG. 22 (that is, a direction that increases from top side 424(1) to bottom side 424(2) is designated as a preferred direction, and the upward lateral direction is designated as a non-preferred direction. The cross-section illustrated in FIG. 22 may extend in the axial direction, linearly and without rotating, from a first end to a second end of luminaire section 20(9), although this is not required. Housing 24(3) forms an aperture 426 through which light is emitted, as described below. A height of aperture 426, measured along the lateral direction, is $H_A$.

LEDs 410 are coupled with housing 24(3) and may be arranged in one or more rows along the axial direction, although this is not required. For example, FIG. 22 illustrates a printed circuit board (PCB) 405 on which LEDs 410 are mounted. PCB 405 extends in the axial direction, and couples with any number of LEDs 410, providing electrical connections and mechanical support thereto. PCB 405 is mechanically coupled with top side 424(1) of housing 20(9) outside the cross-sectional plane shown in FIG. 22. In operation, LEDs 410 emit light downwardly in the view of FIG. 22, that is, towards the preferred lateral direction.

Light guide 415 is coupled within housing 24(3), typically very close to a front surface thereof, such as next to edges of aperture 426. Typically, light guide 415 substantially spans at least height $H_A$ of aperture 426, that is, a height $H_{LG}$ of light guide 415 exceeds $H_A$, and upper and lower edges of light guide 415 are hidden behind portions of housing 24(3) so that those edges are not externally visible. This helps obscure extremely bright regions of light guide 415 adjacent to individual LEDs 410, so that individual LEDs 410 are not discernible. Instead, as explained below, the light output of light guide 415 can be made substantially uniform across aperture 426, for a smooth and uncluttered appearance. However, the hidden portions of light guide 415 are advantageously small so that $H_A$ can be a large fraction of height $H_H$, a total height of luminaire section 20(3). With careful attention to how PCB 405, LEDs 410 and light guide 415 are integrated into housing 24(3), a ratio of $H_A$ to $H_H$ can be 70%, 75%, 80%, 85%, 90%, 95% or more (and of course can be a value intermediate to those listed). For example, in FIG. 22, $H_A/H_H$ is about 80.5%. Because of minimum dimensions that may be required for structural reasons, minimum thicknesses of PCB 405 and LEDs 410, and the like, it may be easier to obtain higher $H_A/H_H$ ratios with wider versions of luminaire section 20(9).

The larger of a width of top side 424(1) and bottom side 424(2) is a width $W_H$ of housing 24(4). An aspect ratio of $H_H$ to $W_H$ can be as low as 1.0, but for a sleek appearance, $H_H/W_H$ is advantageously at least 2, 2.5, 3, 3.5, 4 or more. These high aspect ratios are directly enabled by the use of light guide 415 to allow a thin fixture, as opposed to typical discrete optics which, even when used in conjunction with LEDs, tend to be bulky.

Light guide 415 forms a light coupling surface 416 that faces LEDs 410, so that light coupling surface 416 can receive the light from LEDs 410 as input light, into light guide 415. Light guide 415 is configured to propagate the input light toward the preferred direction, and substantially retain the light by total internal reflection (TIR) between a front surface of light guide 415 that faces aperture 426, and a back surface of light guide 415 that faces away from aperture 426 (see FIG. 23A).

Light guide 415 includes light extraction features 418 (see, for example, FIGS. 23A, 23B, 23C) each of which can redirect a portion of the light propagating through the light guide, out of the TIR condition. This causes the redirected light to exit the front or back light guide surfaces. Light extraction features 418 may be provided either on the front surface, the back surface, or both, of light guide 415. When used on the front surface, light redirected by a light extraction feature 418 may exit light guide 415 directly, or it may be directed into light guide 415 into a steep angle that will not be contained by TIR. Upon reflection by an optional reflector 417 behind light guide 415, this light then passes through the front surface of the light guide. Similarly, when light interacts with extraction features 418 on the back surface, the light may pass toward and through the front surface of light guide 415, or it may reflect from the optional reflector 417 behind light guide 415 before exiting through the front surface.

Light extraction features 418 may be physical features formed by the material of light guide 415, e.g., protrusions, recesses, surface texturing or any combination thereof. Additionally or alternatively, light extraction features 418 may be features applied to the surface of light guide 415 by screen printing, application of a film, painting or the like. Optional reflector 417 may be placed behind light guide 415 to reflect light exiting the back waveguide surface, back through light guide 415. When present, optional reflector 417 is advantageously specular, such that light striking reflector 417 while propagating toward the preferred direction (e.g., top to bottom, in the perspective shown in FIG. 22) continues to propagate toward the preferred direction after reflecting.

Thus, with or without reflecting from optional reflector 417, substantially all of the light redirected out of TIR can be made to exit the front surface of light guide 415, whereupon it will exit luminaire section 20(9) through aperture 426.

Because reflector 417 can be provided integrally with light guides 415 herein, and films, paints and other materials can be used to form light extraction features, it is to be understood that references to a "light guide" herein include any associated light extraction features, though such features may include materials added to the material of the light guide.

One particular advantage of the arrangement illustrated in FIG. 22 is that light will only be emitted through aperture 426. That is, all of the light emitted through aperture 426 will at least be directed toward the normal direction, and no light will be emitted backward (that is, toward the backward normal direction) or directly downward, from luminaire section 20(9). This is particularly advantageous when luminaire section 20(9) is used to provide wall wash functionality. By way of contrast, many ceiling mounted wall wash fixtures emit significant amounts of light directly downward, and/or backward, forming undesirable glare. As discussed further below, the light that is emitted can be directed in various ways to tailor the light distribution from luminaire section 20(9) in various directions.

When included, optional reflector 417 is typically disposed at a small spacing from the back surface of light guide 415, that is, an air gap exists between light guide 415 and optional reflector 417. This makes the TIR properties of light guide 415 independent of the presence of reflector 417. However, this is not a requirement; in alternate embodiments, optional reflector 417 may be in intimate optical contact with the back surface of light guide 415 (e.g., "wetted") and the light extraction features 418 can be formed by cooperating portions of light guide 415 with reflector 417.

Spatial distribution of extraction features 418 can vary across the front and/or back surfaces of light guide 415, to provide more or less light in specific regions. In particular, a density per unit area of extraction features 418 may increase with distance from LEDs 410. In this way, a smaller proportion of light is extracted from volumes of light guide 415 that have a higher light flux in TIR (e.g., close to LEDs 410) and a higher proportion of light is extracted from volumes of light guide 415 that have a lower light flux in TIR (e.g., further from LEDs 410). This helps keep net light output of luminaire portion 20(9) relatively uniform across aperture 426. Perfect uniformity is not required, as the human eye will generally see an illuminated face of luminaire section 20(9) as much brighter than its surroundings, and will thus be desensitized to small variations in brightness across the illuminated face. However, varying density of extraction features 418 to keep point to point uniformity of luminaire section 20(9) within a range of 5 to 1 may be advantageous.

An optional, translucent or transparent cover 430 can be included in luminaire section 20(9). When present, cover 430 may be transparent and planar on both sides, so as to have minimal or no effect on light emitting through aperture 426. Alternatively, cover 430 may be formed of diffusive material or have a diffusive surface to impart some degree of diffusion of the light emitting through aperture 426, although generally such diffusion should be minimal so as not to disrupt the directionality of the light. Still alternatively, cover 430 may form refractive surfaces on an inner or outer surface thereof, to modify directionality of light emitting through aperture 426. One skilled in the art will readily conceive of many possible implementations, modifications, alternative constructions and equivalents, all of which are within the scope of the present disclosure.

Figure 23A:
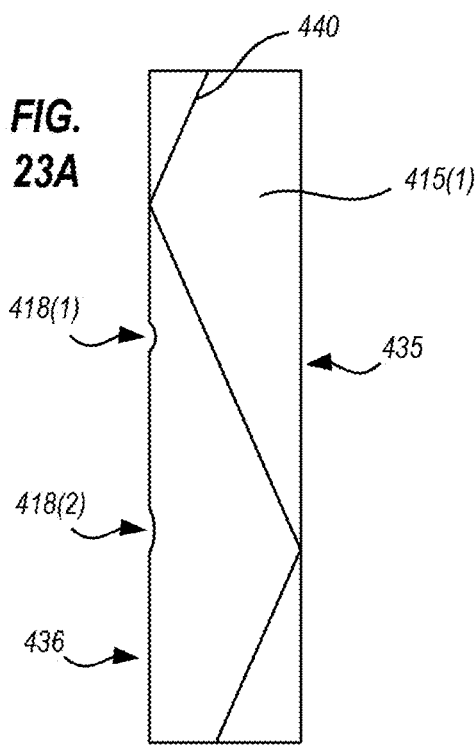
FIG. 23A illustrates total internal reflection in a waveguide, in accord with one or more embodiments.
Figure 23B:
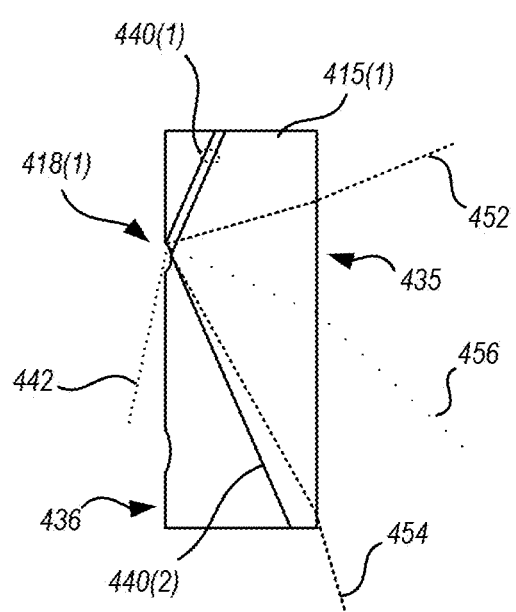
FIG. 23B illustrates the effect of a particular light extraction feature on light beams, in accord with one or more embodiments.
Figure 23C:
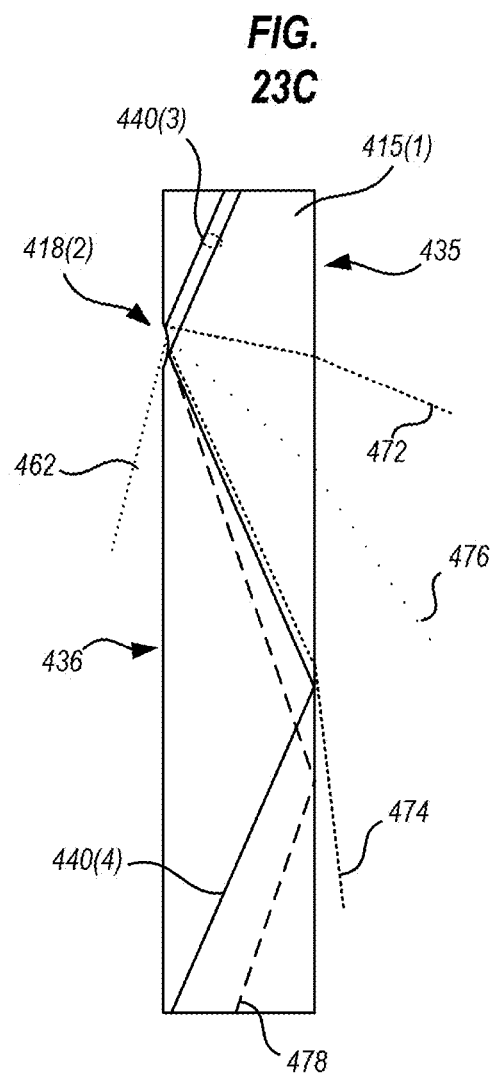
FIG. 23C illustrates the effect of another particular light extraction feature on light beams, in accord with one or more embodiments.

FIGS. 23A, 23B and 23C illustrate how certain light extraction features can be used to redirect light out of a surface of the light guide, while maintaining some of the light's original directionality. Upon reading and comprehending the present disclosure, one skilled in the art will understand how to provide light extraction features to provide a distribution of redirected light as required for a given lighting application.

FIG. 23A illustrates total internal reflection in a light guide 415(1). Light guide 415(1) is bounded by a front surface 435 and a back surface 436, and includes two differently shaped light extraction features 418(1), 418(2) (however, FIG. 23A does not show light interacting with these features; see FIGS. 23B, 23C respectively). Light extraction features 418(1) and 418(2) correspond to recesses within back surface 436 and are of about the same depth, but light extraction feature 418(1) is more abrupt (e.g., presents relatively steep angles with respect to back surface 436) while light extraction feature 418(2) is shallower (e.g., presents relatively small angles with respect to back surface 436). For illustrative purposes, light extraction features 418(1) and 418(2) are assumed to be curved recesses within back surface 436, although this is not required. Other light extraction features 418 may be curved, straight or irregular, and may be arranged on or in the front surface 435 and/or back surface 436 of a light guide 415. Knowledge of how Fresnel reflections, TIR, and Snell's law govern light behavior at interfaces can be used to determine light response to any such light extraction features 418. A non-quantitative example is given below, but one skilled in the art will be able to extend the principles discussed to light extraction features 418 of any shape or size.

Light guide 415(1) can contain light that is coupled into it, by TIR, as long as (1) the incidence angle of the light at front and back surfaces 435 and 436 with respect to the normal direction does meets or exceeds a critical angle; and (2) the light does not strike any feature that otherwise disrupts the TIR condition. As is known in optics, the minimum angle of light, with respect to the normal direction, that can be contained by TIR can be controlled by controlling the refractive index of the material forming light guide 415(1). (Strictly speaking, the refractive index of the adjacent medium is also controlled, but the adjacent medium is usually air.) A single light beam 440 is shown in FIG. 23A, and for illustrative purposes, all light beams 440 shown in FIGS. 23A, 23B and 23C propagate at the maximum angle that can be contained within light guide 415(1) by TIR. Because light beam 440 does not intersect either of light extraction features 418(1) or 418(2), the light continues to reflect and be contained by TIR as it passes through light guide 415(1). Light beam 440 enters light guide 415(1) propagating toward a preferred direction (e.g., downward in the perspective of FIGS. 23A, 23B and 23C). FIGS. 23B and 23C illustrate how light extraction features can redirect light beam 440 out of the TIR condition while keeping a majority of the redirected light propagating toward the preferred direction.

FIG. 23B illustrates the effect of abrupt light extraction feature 418(1) on light beams 440(1) that strike light extraction feature 418(1). At light extraction feature 418(1), one portion of light beams 440(2) transmits out of light guide 415(1) into the adjacent space, and is refracted to form light beam 442. Light beam 442 continues traveling toward the preferred direction, and can be reflected back into light guide 415(1) by reflector 417 (not shown in FIG. 23B, see FIG. 22). (Another portion, not shown in FIG. 23B, may re-enter light guide 415(1) and either be contained therein by TIR or redirected so as to leave light guide 415(1).)

Because the angle presented by light extraction feature 418(1) is relatively steep where it intersects back surface 436, a portion of light beam 440(1) that strikes at this location is reflected somewhat steeply as a marginal light beam 452. Light beam 452 actually propagates upward in FIG. 23B, that is, toward the non-preferred direction. However, other portions of light beams 440(1) reflect as a second light beam 454, and a chief light beam 456 having an angle that corresponds to the average reflected angle. A portion of light beam 440(1) that strikes a point centered exactly on an apex of light extraction feature 418(1) (that is, where the slope is parallel with back surface 436) is reflected as light beam 440(2). Light beam 440(2) and any other beams that strike portions of light extraction feature 418(1) beyond the apex are redirected into shallower angles than light beams 440(1), and thus remain contained within light guide 415(1) by TIR. However, because light extraction feature 418(1) is relatively abrupt, only a small proportion of light beams 440(1) will be thus redirected.

Thus, it can be seen that although a small portion of light from light beams 440(1) reflect from light extracting feature 418(1) toward the non-preferred direction, much of the light reflects toward the preferred direction or remains contained within light guide 415(1). Since refracted light beam 442 adds to the total of light propagating toward the preferred direction, even an abrupt light extraction feature 418(1) can maintain directionality of most of the redirected light towards the preferred direction.

FIG. 23C illustrates the effect of shallow light extraction feature 418(2) on light beams 440(3). At light extraction feature 418(2), one portion of light beams 440(3) transmits out of light guide 415(1) into the adjacent space, and is refracted to form light beam 462, which continues traveling toward the preferred direction. Like light beam 442 (FIG. 23B), an illustrated portion of light beam 462 continues traveling toward the preferred direction, and can be reflected back into light guide 415(1) by reflector 417, while a non-illustrated portion may re-enter light guide 415(1) and either be contained therein by TIR or redirected so as to leave light guide 415(1).

Because the angle presented by light extraction feature 418(2) is relatively shallow where it intersects back surface 436, a marginal light beam 472 formed by a portion of light beam 440(3) that strikes at this location continues to propagates downward in FIG. 23C, that is, toward the preferred direction. Other portions of light beams 440(3) reflect as a second light beam 474, and a chief light beam 476 having an angle that corresponds to the average reflected angle. A portion of light beams 440(3) that strikes a point centered exactly on an apex of light extraction feature 418(2) is reflected as light beam 440(4). Any portion of light beams 440(3) that strike portions of light extraction feature 418(1) beyond the apex also remains contained within light guide 415(1) by TIR; one such beam 478 is illustrated in FIG. 23C. Because light extraction feature 418(2) is relatively shallow, a larger proportion of light beams 440(3) will be thus redirected than the equivalent case for light beams 440(1) and light extraction feature 418(1).

Thus, it can be seen that light extracting feature 418(2) directs essentially all of the light that strikes it and escapes light guide 415(1), toward the preferred direction, while another portion of the redirected light remains contained within light guide 415(1). Shallow light extraction feature 418(1) maintains directionality of essentially all of the redirected light towards the preferred direction.

It should thus be appreciated that characteristics and/or placement of a light extraction feature 418 can be adjusted to change proportions of light scattered by the light extraction feature toward specific directions, such as the preferred and non-preferred directions. Similarly, because all of the light scattered by light extraction feature 418(2) continues to propagate toward the preferred direction, while at least some light scattered by light extraction feature 418(1) propagates toward the non-preferred direction, adjusting relative population numbers of light extraction features 418(1) and 418(2) in a light guide can be used to adjust a net proportion of light scattered into the preferred and non-preferred directions. Additionally, other types of light extraction features 418 can be used and can redirect controllable portions of input light so as to control proportions of light scattered into axial directions, as well as preferred and non-preferred directions (see, e.g., FIGS. 24A through 24F, and their associated discussions). For example, in embodiments, 50%, 60%, 70%, 80%, 90% or 95% of the input light can be directed toward the preferred direction, with the balance being directed toward the non-preferred direction, and with the light also being spread along the axial direction. Particularly advantageous distributions direct at least 60% or at least 70% of light intensity emitted by luminaire section 20(9) at least somewhat downward, that is, between the normal direction (N) and the preferred direction (nadir, in the orientation of FIG. 22). This and other distributions may form a peak light intensity at an angular value that is between 30 to 80 degrees from the normal direction toward the preferred direction. These and other distributions may direct at least 20% of the light intensity between the normal direction the non-preferred direction (zenith, in the orientation of FIG. 22).

It should also be appreciated that although the redirection behavior illustrated in FIGS. 23B and 23C is shown in a particular two-dimensional plane, and thus illustrates effects as though the light beams and light extraction features were uniform in and out of the illustrated plane, extensions of light extracting features in and out of the plane will typically not be uniform. Effects of three-dimensional features can be determined by applying the principles discussed above to surfaces that are angled and/or curved in the axial direction, and light beams that propagate in the axial direction, as well.

FIGS. 24A, 24B, 24C, 24D, and 24E are specific examples of light extraction features 418. Light extraction features 418(3), 418(4), 418(5), 418(6), and 418(7) are illustrated as protrusions that may extend from back surface 436 of a light guide 415. However, the corresponding shapes could be formed as indentations within back surface 436, or could be formed either as protrusions from, or indentations within, front surface 435. From the discussion above with respect to light extraction features 418(1) and 418(2), one skilled in the art can determine how the shapes of light extraction features 418(3), 418(4), 418(5), 418(6), 418(7), and 418(8) will affect light incident thereon.

Figure 24A:
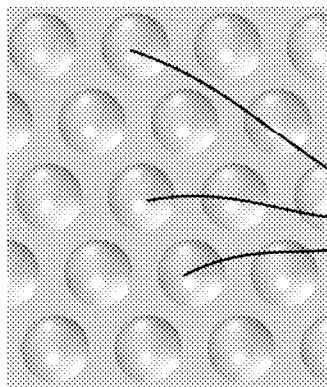
FIG. 24A schematically illustrates light extraction features that are rounded shapes, in accord with one or more embodiments.
Figure 24B:
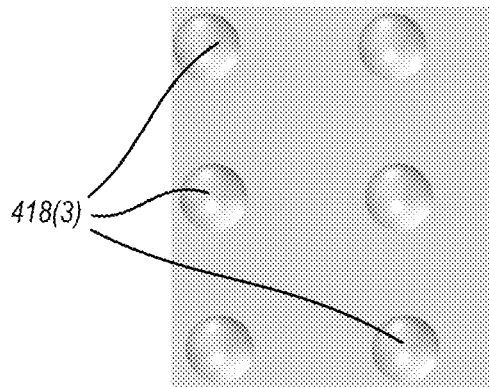
FIG. 24B schematically illustrates light extraction features that are rounded shapes, but are provided at a lower density than in FIG. 24A, in accord with one or more embodiments.

Light extraction features 418(3) shown in FIGS. 24A and 24B, are rounded shapes similar to light extraction features 418(1) and 418(2). In FIG. 24A, light extraction features 418(3) are relatively densely packed with one another, while in FIG. 24B they are much further apart. Density of light extraction features 418(3) (or any other light extraction features disclosed herein) can be used to adjust the amount of light scattered out of a light guide 415. This allows compensation for effects such as higher light density within light guide 415 near light sources, and lower light density at a distance from the light sources (e.g., after some of the light has been scattered out of the light guide).

Figure 24C:
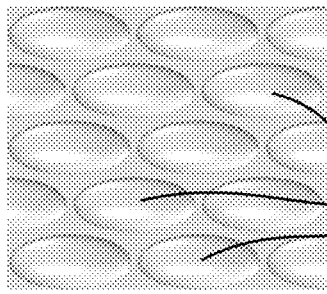
FIG. 24C schematically illustrates light extraction features that are ellipsoidal shapes, in accord with one or more embodiments.

Light extraction features 418(4) shown in FIG. 24C have ellipsoidal shapes. Because light extraction features 418(4) provide more variation over distance in the lateral direction (up and down in the view of FIG. 24C) than in the axial direction (side to side), they will provide greater scattering in the lateral direction than in the axial direction. One skilled in the art will be able to determine how to form and use light extraction features 418(4) to redirect a light incident thereon into a first range of angles toward or away from a preferred direction, and into a smaller range of angles in an axial direction.

Figure 24D:
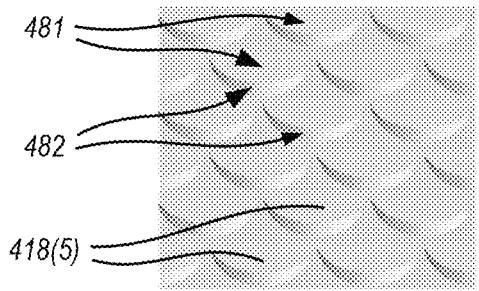
FIG. 24D schematically illustrates light extraction features that resemble scalloped shapes, in accord with one or more embodiments.

Light extraction features 418(5) shown in FIG. 24D resemble scalloped shapes, each having one flat surface 481 and one curved surface 482. One skilled in the art will be able to determine how to use light extraction features 418(5) formed on a back surface of a light guide 415, to reflect a portion of light incident onto flat surfaces 481 into a very specific redirected angle. In this way, a plurality of light extraction features 418(5) may be used to create extracted light having a narrow distribution of output angles. Alternatively, if light extraction features 418(5) are formed on a front surface of light guide 415, light traveling through the light guide can enter the light extraction features 418(5) where flat surfaces 481 extends from the light guide surface, and can exit the light extraction features 418(5) through curved surfaces 482. Using the techniques explained here, it is possible to create output light distributions aimed toward very tightly controlled angles and with very narrow peak intensity widths. For example, output light distributions can be controlled to exit a light guide 415 that are centered about angles of 30, 40, 50, 60, 70, 75, or 80 degrees away from the normal direction toward the preferred direction (with any angular value intermediate to those listed, also being possible). Particularly advantageous angles for wall wash applications include peak angles of 60 to 75 degrees away from the normal direction toward the preferred direction. A ratio of highest emitted light intensity (e.g., measured at the angle of peak intensity) to emitted light intensity in the normal direction can be 1.5:1, 2:1, 3:1 or 4:1, or any value therebetween, with a ratio of at least 3:1 being particularly advantageous for visual interest when highlighting a wall-mounted feature.

Figure 24E:
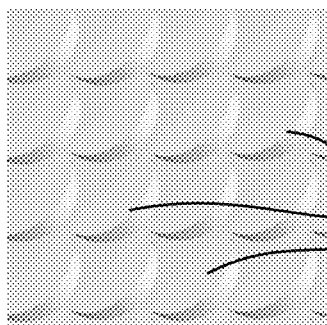
FIG. 24E schematically illustrates light extraction features that resemble scalloped shapes, and are oriented at an angle, in accord with one or more embodiments.

Like light extraction features 418(5) (FIG. 24D), light extraction features 418(6) shown in FIG. 24E also resemble scalloped shapes, but each light extraction feature 418(6) is oriented at a 45 degree angle as compared with light extraction features 418(5). One skilled in the art will be able to determine how to use light extraction features 418(6) to redirect light to form an asymmetric distribution in the left to right direction. For example, if the preferred direction is top to bottom in FIG. 24E, and left to right is the axial direction, the redirected light will form an asymmetric distribution axially.

Figure 24F:
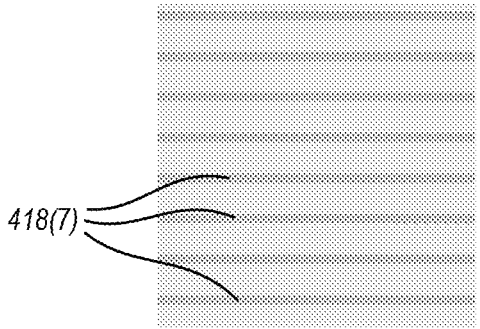
FIG. 24F schematically illustrates linear light extraction features, in accord with one or more embodiments.

FIG. 24F schematically illustrates linear light extraction features 418(7) that may be formed on a light guide 415. Light extraction features may be grooves or ridges on the front or back surface of a light guide 415, and may be V-shaped, rounded, rectilinear or any other shape in cross-sectional profile. One skilled in the art will understand that if the original direction of light propagation within a light guide 415 is from top to bottom (e.g., the lateral direction) in the orientation of FIG. 24F, that light extraction features 418(7) will redirect light exclusively in the lateral direction and not at all in the axial direction.

It will be appreciated by those skilled in the relevant arts that many variations on the principles illustrated through FIGS. 23A, 23B, 23C, 24A, 24B, 24C, 24D, 24E and 24F are possible and can be exploited to redirect light in various directions. For example, using the principles discussed in connection with FIGS. 23A, 23B and 23C, and the examples shown in FIGS. 24A, 24B, 24C, 24D, 24E and 24F, the skilled person can determine appropriately shaped and oriented light extracting features to redirect light in a very diffuse way (e.g., an omnidirectional pattern); to maintain directionality with respect to a preferred direction, or to reflect a substantial amount of light back toward a non-preferred direction; and/or to extend the effects illustrated in the single planes shown in FIGS. 23B and 23C into the axial direction as well, to provide either a narrow or a wide axial distribution. Use of a light guide 415 to provide an area light source advantageously spreads the luminance provided over a large area, instead of the luminance coming from one or more bright point sources. This helps to minimize viewer discomfort when the area light source is viewed directly, and mitigates shadowing that would otherwise occur when light is provided from one or more bright point sources. The exemplary light extraction features 418 shown in FIGS. 24A through 24F, and/or others, can be formed on a back side or a front side of a light guide 415. Different types, densities and/or orientations of light extraction features 418 can be mixed within a single light guide 415.

The foregoing is provided for purposes of illustrating, explaining, and describing various embodiments and techniques. Having described these embodiments and techniques, it will be recognized by those of skill in the art that various modifications, alternative constructions, and equivalents may be used without departing from the spirit of what is disclosed. Different arrangements of the components depicted in the drawings or described above, as well as additional components and steps not shown or described, are possible. Certain features and subcombinations of features disclosed herein are useful and may be employed without reference to other features and subcombinations. Additionally, a number of well-known processes and elements have not been described in order to avoid unnecessarily obscuring the embodiments. Embodiments have been described for illustrative and not restrictive purposes, and alternative embodiments will become apparent to readers of this patent. Accordingly, embodiments are not limited to those described above or depicted in the drawings, and various modifications can be made without departing from the scope of the claims below. Embodiments covered by this patent are defined by the claims below, and not by the brief summary and the detailed description.

What is claimed is:

1. A luminaire, comprising:
a housing, a plurality of light-emitting diodes (LEDs) and a light guide, wherein:
the housing defines a cross-section, wherein:
respective top and bottom sides of the housing extend along a normal direction,
a distance between a top surface of the top side and a bottom surface of the bottom side defines a height of the housing,
the height of the housing extends along a lateral direction from the top side of the housing to the bottom side of the housing, the lateral direction being transverse to the normal direction,
the lateral direction from the top side to the bottom side is a preferred direction,
the lateral direction from the bottom side to the top side is a non-preferred direction,
the cross-section extends, linearly and without rotating, along an axial direction that is transverse to the normal and lateral directions, from a first end to a second end of the housing, a distance between the first end and the second end of the housing defining a length therebetween, and
a front side of the housing forms an aperture characterized by a height of the aperture along the lateral direction;
the plurality of LEDs is arranged along the axial direction and coupled with the housing, such that in operation, the plurality of LEDs emits light predominantly toward the preferred direction within the housing;

the light guide is coupled within the housing and substantially spans at least the height of the aperture along a plane that is perpendicular to the normal direction, the light guide forms a light coupling surface that faces the plurality of LEDs, the light coupling surface is closer to the top side of the housing, along the lateral direction, than an upper edge of the aperture, the light coupling surface of the light guide is configured to receive the light from the plurality of LEDs as input light, the light guide is configured to propagate the input light toward the preferred direction, and substantially retain the light by total internal reflection between a front surface of the light guide that faces the aperture, and a back surface of the light guide that faces away from the aperture, the light guide includes a plurality of light extraction features configured to redirect a portion of the light out of total internal reflection as the input light propagates toward the lateral direction, so that the portion of the light exits the housing through the aperture, and the light extraction features are configured to redirect the portion of the light so that more of the portion of the light exits the aperture between the normal direction and the preferred direction, than between the normal direction and the non-preferred direction.

2. The luminaire of claim 1, wherein the cross-section of the housing is substantially rectangular.

3. The luminaire of claim 1, wherein:
the larger of a width of the top side and a width of the bottom side defines a width of the housing, and
an aspect ratio of the height of the housing to the width of the housing is at least 2.

4. The luminaire of claim 1, wherein the aperture height is at least 75% of the height of the housing.

5. The luminaire of claim 1, the light guide further comprising a reflector disposed between the back surface of the light guide and a back side of the housing, wherein in operation, the reflector reflects light that exits the back surface of the light guide, toward the front surface of the light guide.

6. The luminaire of claim 1, wherein the light extraction features increase in density along the lateral direction, such that, in operation, volumes of the light guide in which light density of the input light is reduced have more light extraction features, compared with volumes of the light guide in which light density of the input light is greater.

7. The luminaire of claim 5, wherein the reflector is a specular reflector that, in operation, maintains directionality of the light as it reflects from the reflector.

8. The luminaire of claim 1, further comprising a transparent or translucent cover that substantially spans the aperture, such that in operation, light exiting the front surface of the light guide passes through the cover.

9. The luminaire of claim 8, wherein, in operation, the cover is configured to impart diffusion to the portion of the light.

10. The luminaire of claim 1, wherein, in operation, all light that is emitted through the aperture is emitted toward the normal direction, and no light is emitted in a reverse direction that is opposite to the normal direction.

11. The luminaire of claim 1, wherein, in operation, at least 60% of a light intensity of the portion of the light is emitted between the normal direction and the preferred direction.

12. The luminaire of claim 11, wherein, in operation, at least 70% of a light intensity of the portion of the light is emitted between the normal direction and the preferred direction.

13. The luminaire of claim 1, wherein, in operation, a peak light intensity of the portion of the light occurs at an angular value that is between 50 to 80 degrees from the normal direction toward the preferred direction.

14. The luminaire of claim 13, wherein, in operation, a peak light intensity of the portion of the light occurs at an angular value that is between 60 to 75 degrees from the normal direction toward the preferred direction.

15. The luminaire of claim 1, wherein, in operation, a ratio of peak light intensity emitted at any angle, to light intensity emitted toward the normal direction, is at least 2:1.

16. The luminaire of claim 15, wherein, in operation, a ratio of peak light intensity emitted at any angle, to light intensity emitted toward the normal direction, is at least 3:1.

17. The luminaire of claim 1, wherein, in operation, at least 20% of a light intensity of the portion of the light is emitted between the normal direction and the non-preferred direction.

* * * * *